US012689511B2

(12) United States Patent
  Kong

(10) Patent No.: US 12,689,511 B2
(45) Date of Patent: Jul. 21, 2026

(54) APPARATUS AND METHOD FOR MONITORING AND CONTROLLING ON BASIS OF DEVICE SPECIFICATIONS

(71) Applicant: LG ELECTRONICS INC., Seoul (KR)

(72) Inventor: Hyun Woo Kong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 18/837,939

(22) PCT Filed: Dec. 13, 2022

(86) PCT No.: PCT/KR2022/020198
 § 371 (c)(1),
 (2) Date: Aug. 13, 2024

(87) PCT Pub. No.: WO2023/158074
 PCT Pub. Date: Aug. 24, 2023

(65) Prior Publication Data
 US 2025/0150273 A1 May 8, 2025

(30) Foreign Application Priority Data

Feb. 17, 2022 (KR) ........................ 10-2022-0021020

(51) Int. Cl.
 *H04L 29/06* (2006.01)
 *H04L 9/32* (2006.01)
 *H04L 9/40* (2022.01)
(52) U.S. Cl.
 CPC ................. *H04L 9/32* (2013.01); *H04L 9/40* (2022.05); *H04L 63/0823* (2013.01)

(58) Field of Classification Search
 None
 See application file for complete search history.

(56) References Cited

U.S. PATENT DOCUMENTS

2017/0235585 A1 8/2017 Gupta et al.

FOREIGN PATENT DOCUMENTS

| JP | 2004005629 A | * | 1/2004 | ........... | G06Q 20/023 |
| KR | 10-1019918 | | 3/2011 | | |
| KR | 10-1205671 | | 11/2012 | | |
| KR | 101205671 B1 | * | 11/2012 | ............ | H04W 84/18 |
| KR | 10-2014-0032263 | | 3/2014 | | |

(Continued)

OTHER PUBLICATIONS

Korean Office Action dated Apr. 14, 2025 issued in Application No. 10-2022-0021020.

(Continued)

*Primary Examiner* — Andrew J Steinle
(74) *Attorney, Agent, or Firm* — KED & ASSOCIATES, LLP

(57) ABSTRACT

The present invention relates to an apparatus and a method for monitoring and controlling on the basis of device specifications. The method for monitoring and controlling on the basis of device specifications, according to one embodiment of the present invention, comprises steps in which: an electronic device receives first device specifications from a server; and the electronic device transmits, to the server, a first result generated according to a rule defined in the first device specifications.

17 Claims, 14 Drawing Sheets

(56)         References Cited

FOREIGN PATENT DOCUMENTS

| KR | 10-1778768 | 9/2017 | |
| KR | 10-2019-0043401 | 4/2019 | |
| KR | 10-2019-0048587 | 5/2019 | |
| KR | 20190048587 A * | 5/2019 | ........... H04L 63/105 |
| KR | 10-1999886 | 10/2019 | |
| KR | 10-2021-0097469 | 8/2021 | |
| KR | 10-2021-0115440 | 9/2021 | |
| KR | 10-2021-0146045 | 12/2021 | |
| WO | WO 2012/093897 | 7/2012 | |

OTHER PUBLICATIONS

International Search Report dated Mar. 21, 2023 issued in Application No. PCT/KR2022/020198.

* cited by examiner

【FIG. 1】
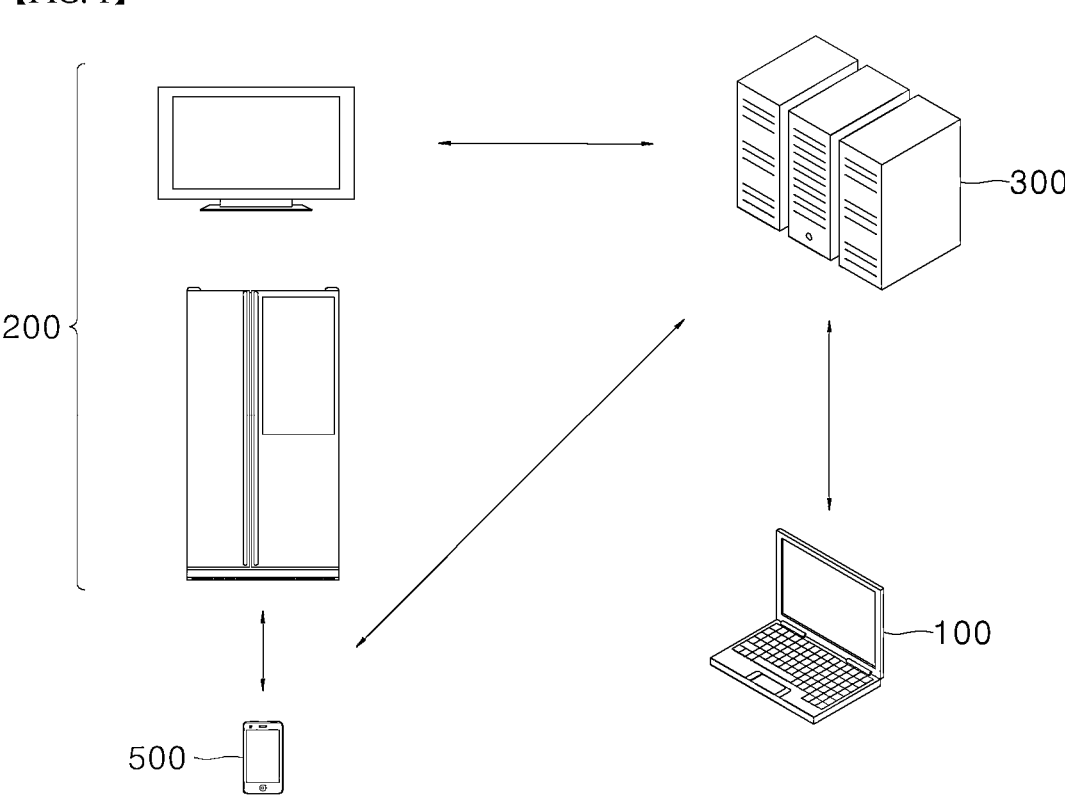
【FIG. 2】
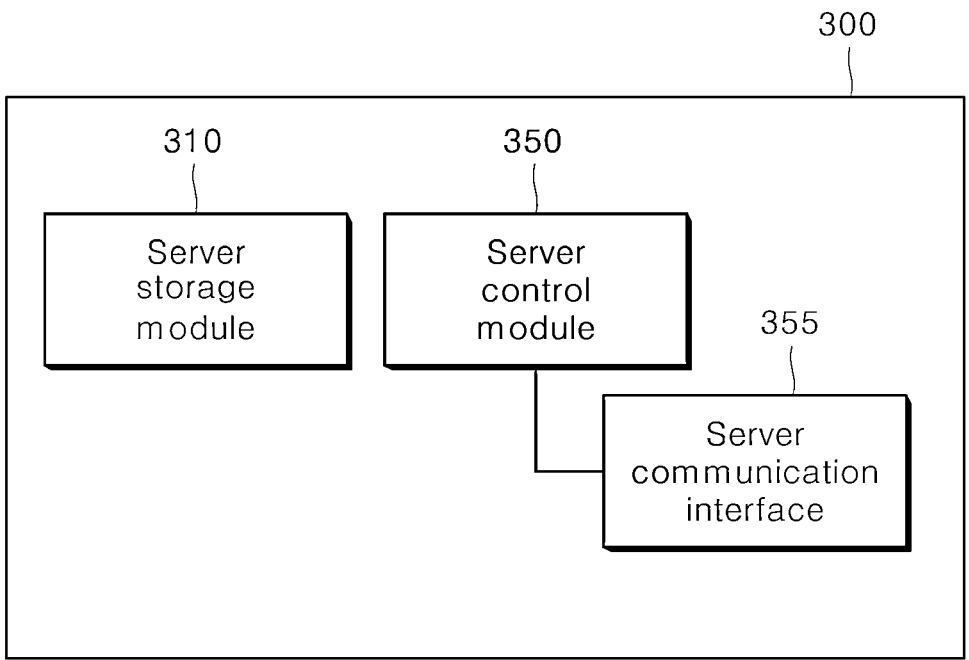

【FIG. 3】
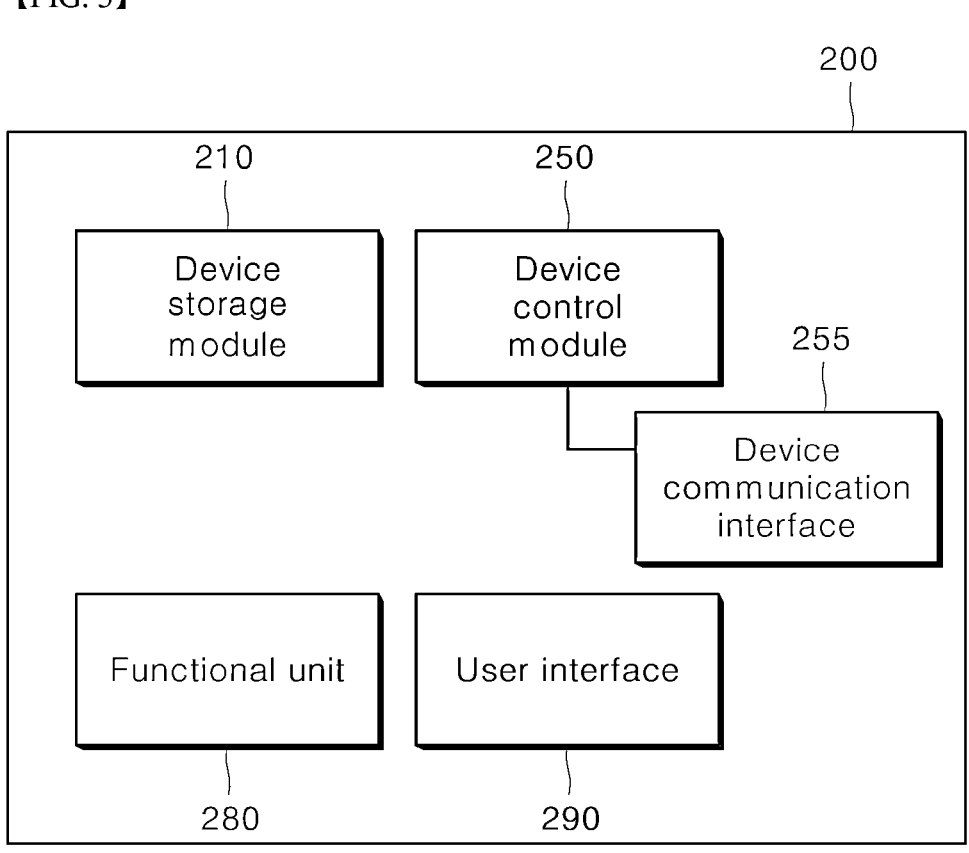

[FIG. 4]

【FIG. 5】
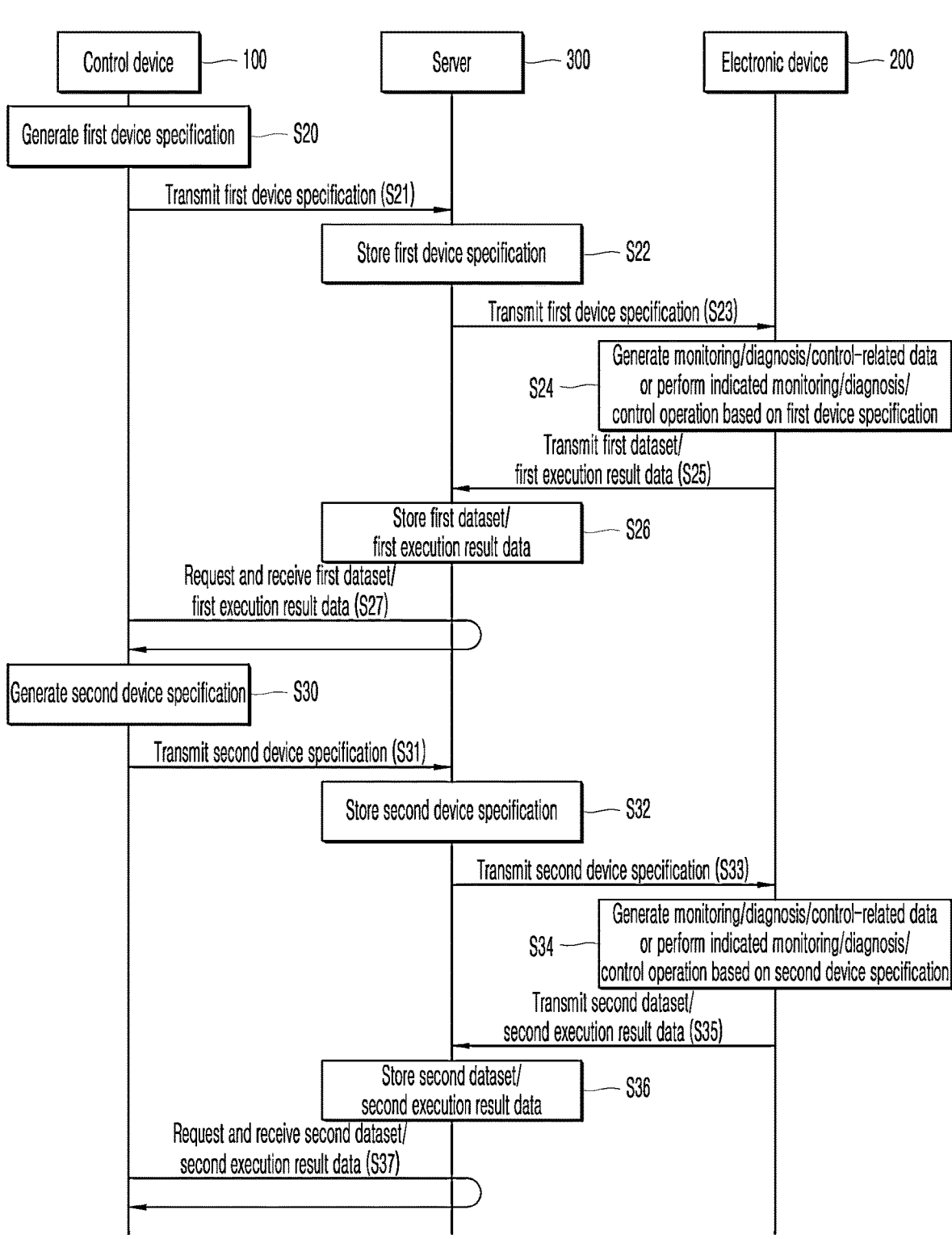

[FIG. 6]
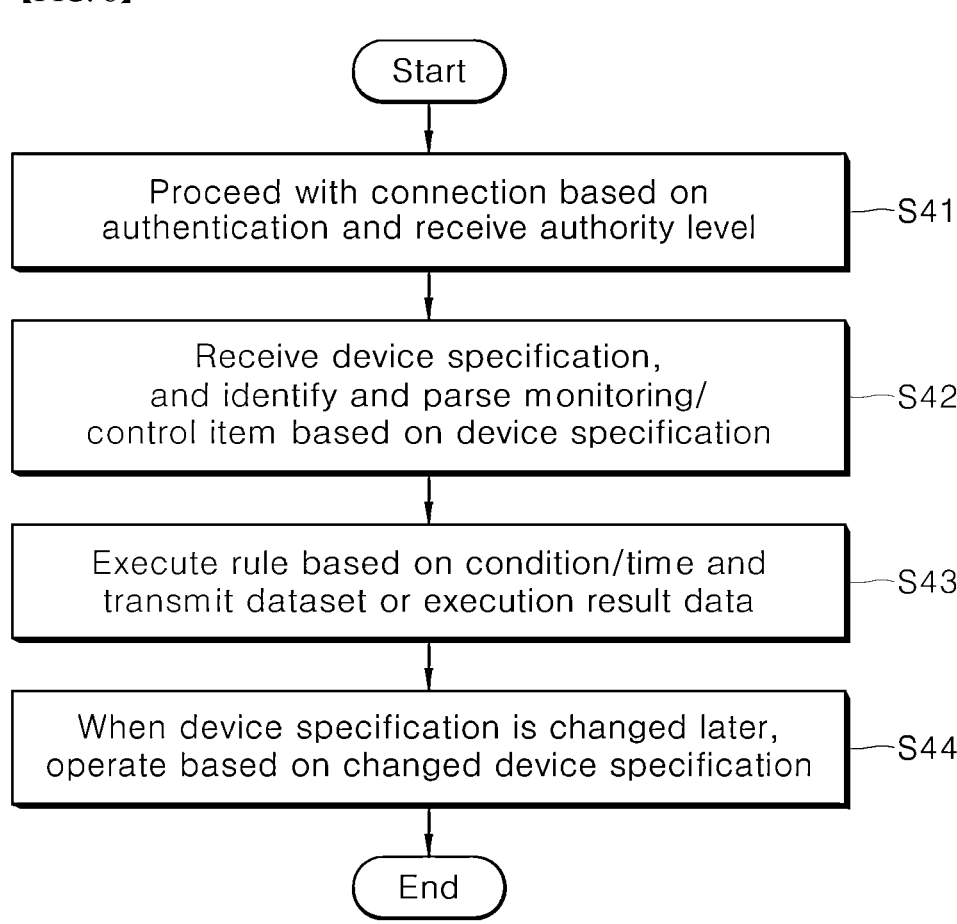

【FIG. 7】
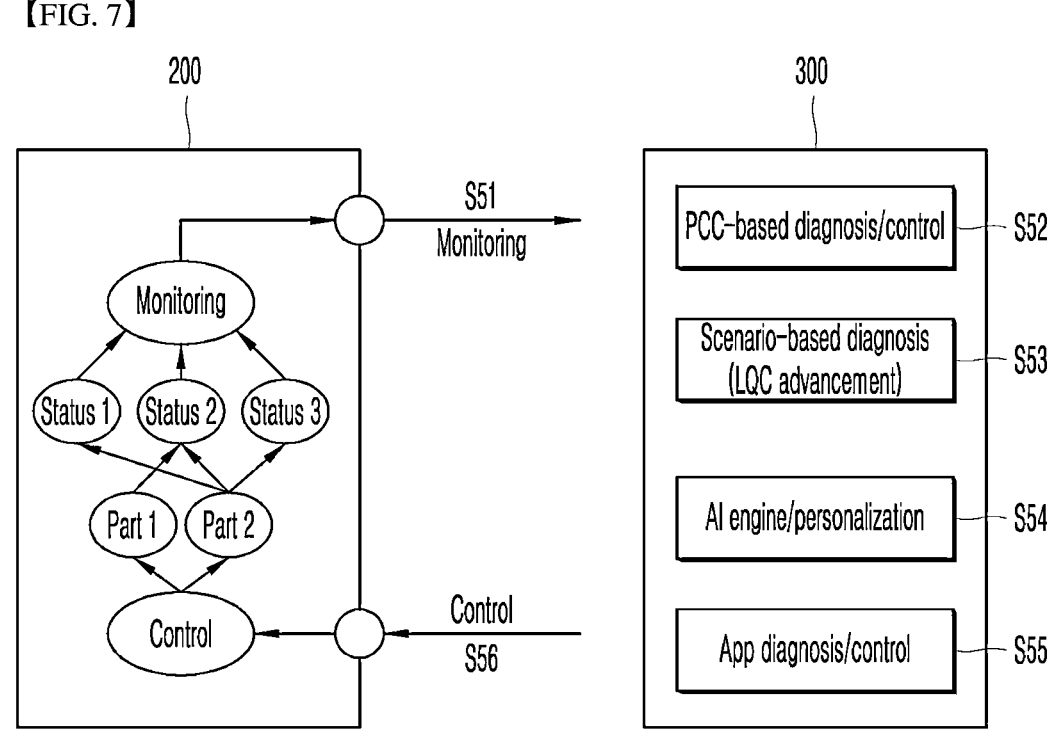

【FIG. 8】
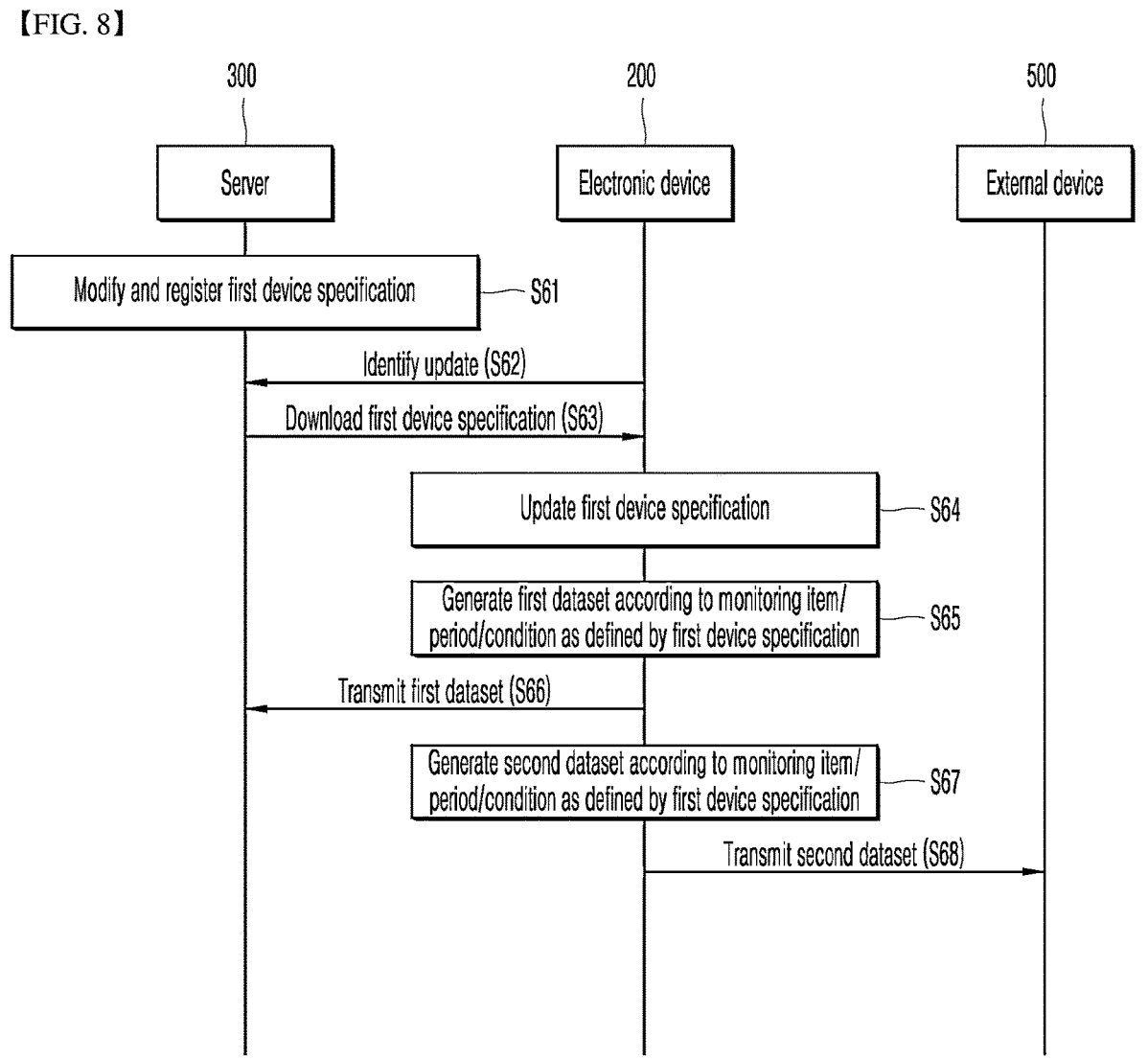

【FIG. 9】
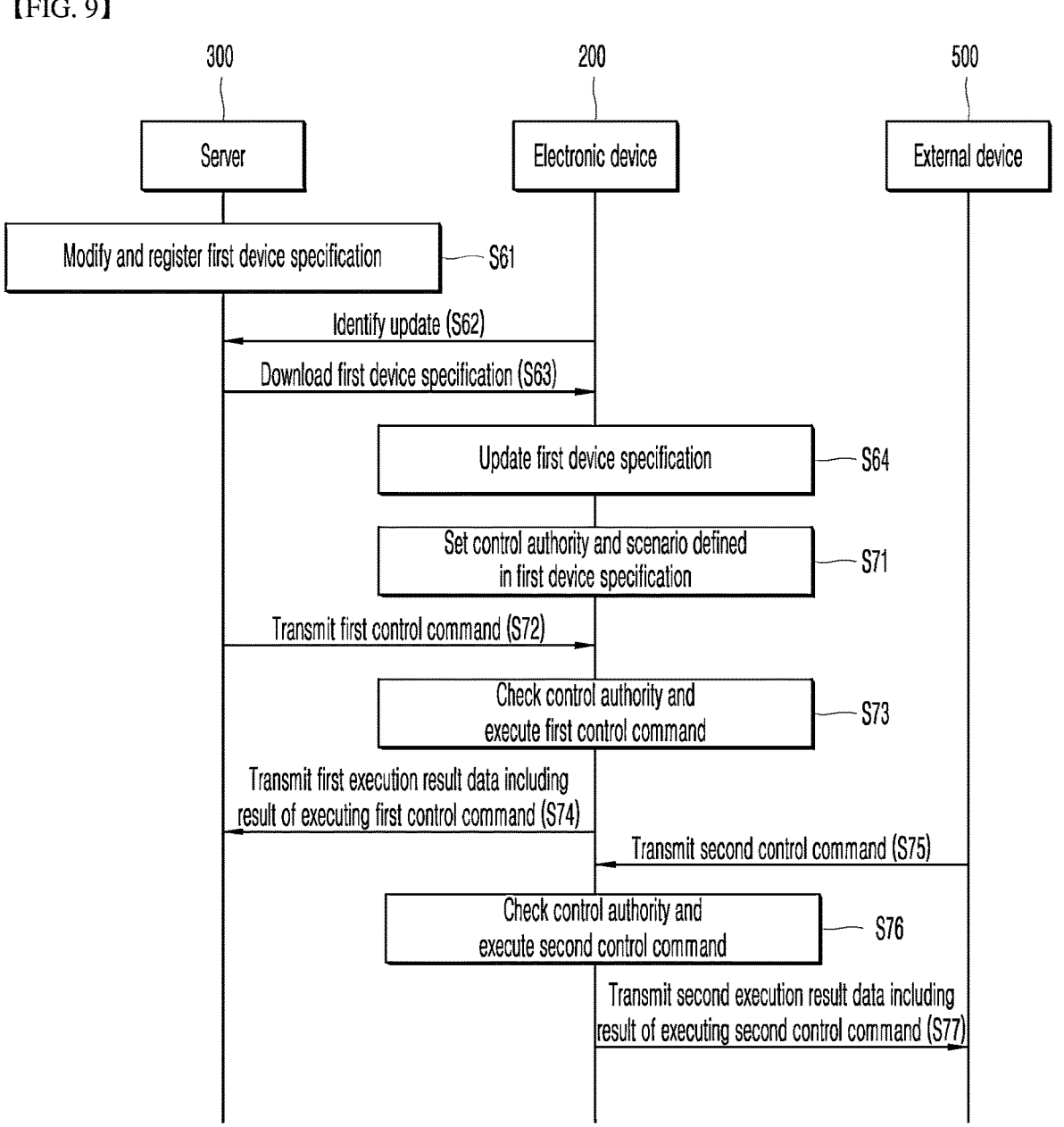

[FIG. 10]
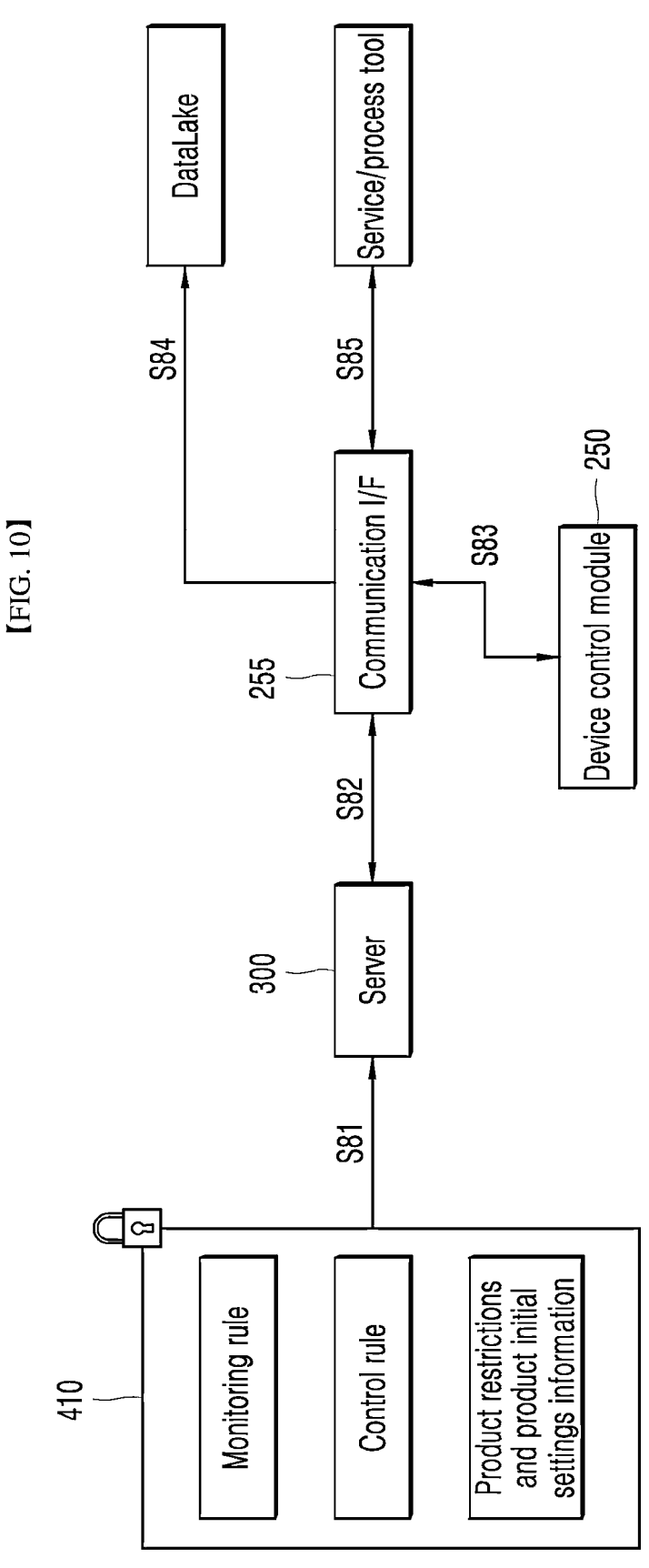

[FIG. 11]
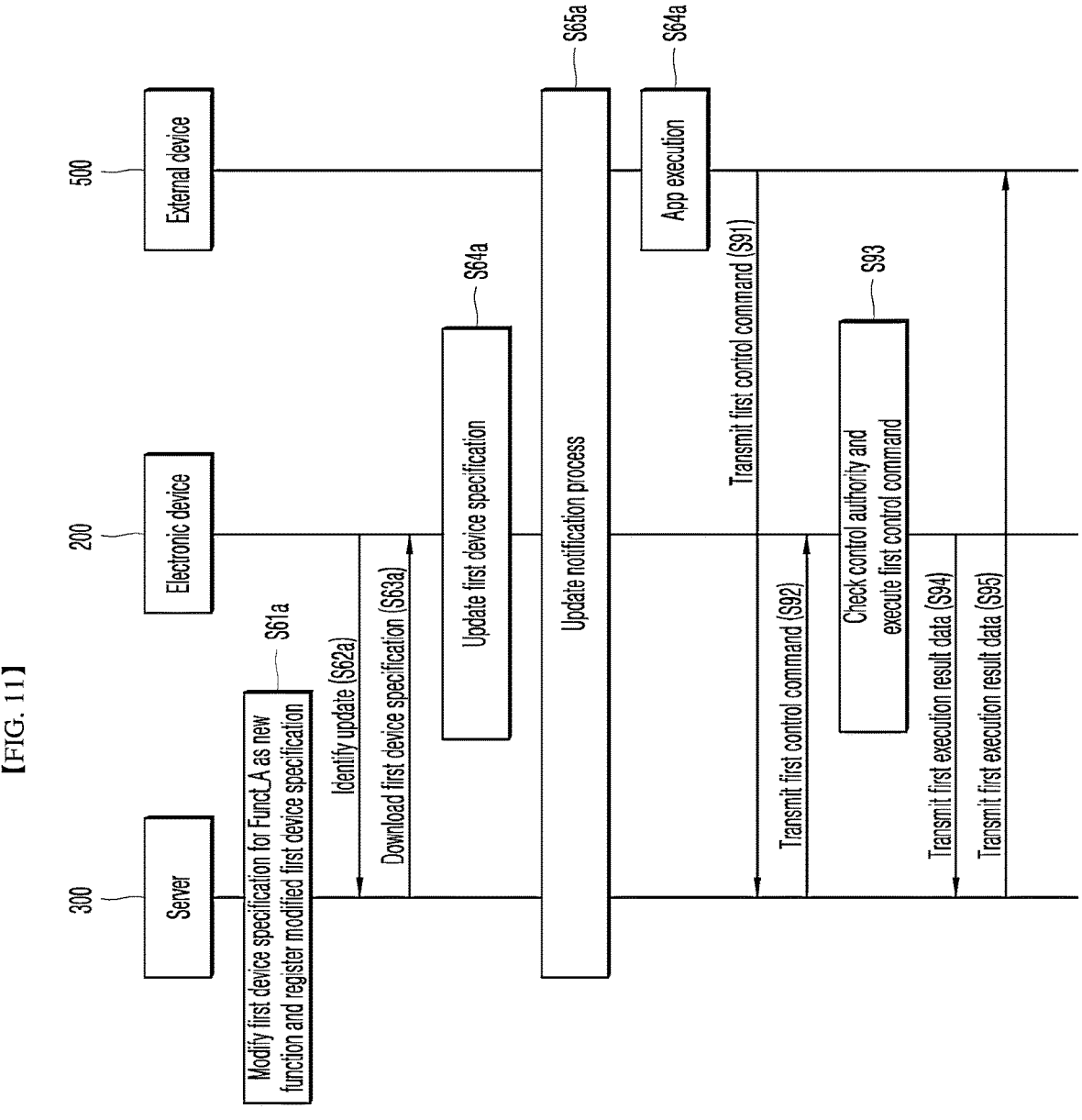

Figure 12:
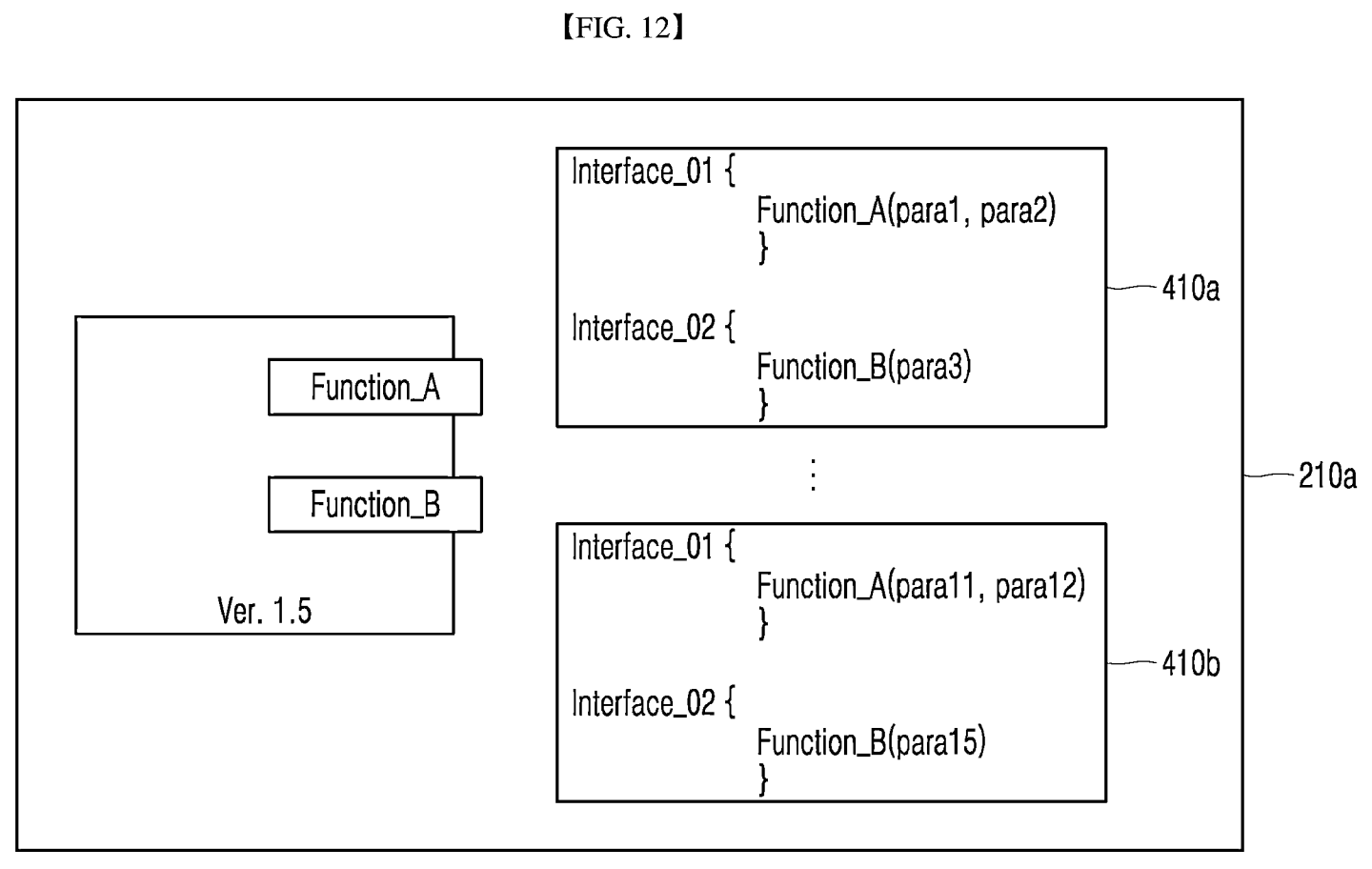

Interface_01 {
    Function_A(para1, para2)
}

Interface_02 {
    Function_B(para3)
}

. . .

410b

Interface_01 {
    Function_A(para11, para12)
}

Interface_02 {
    Function_B(para15)
}

Function_A

Function_B

Ver. 1.5

[FIG. 13]
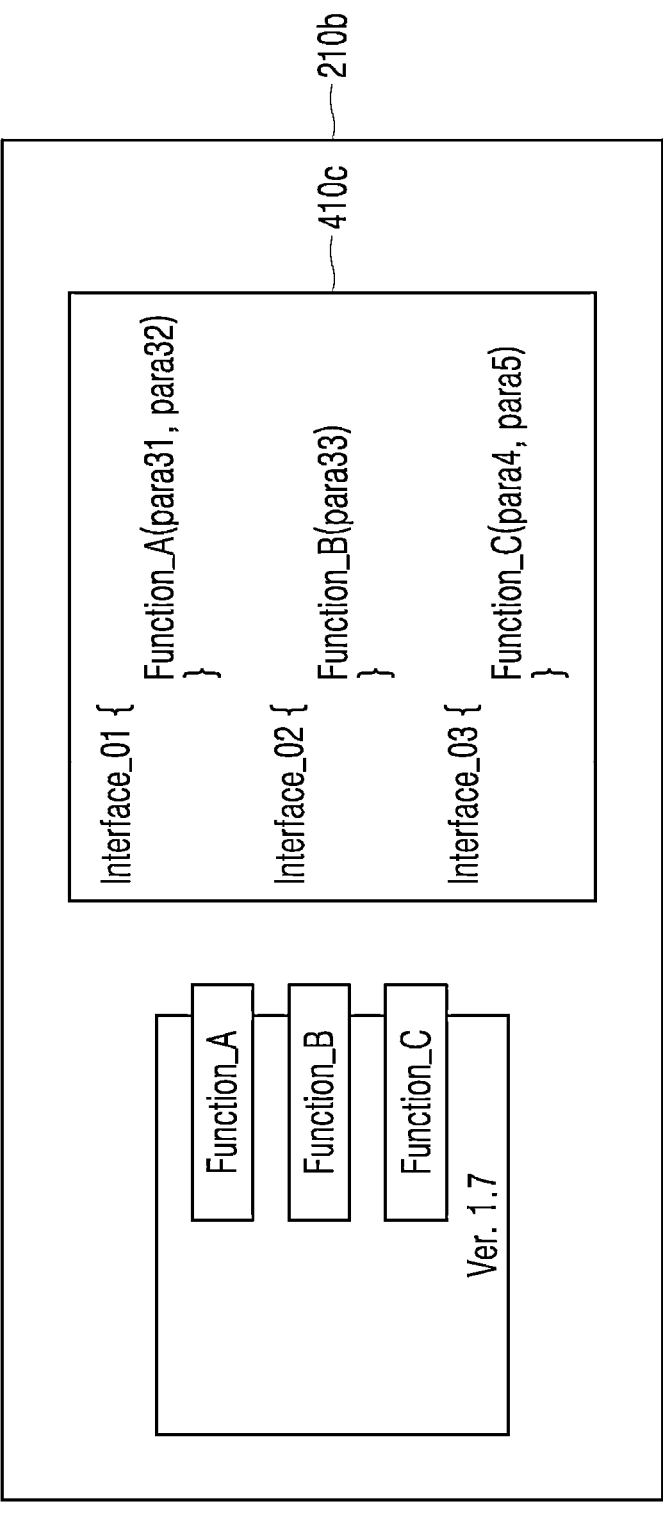

【FIG. 14】

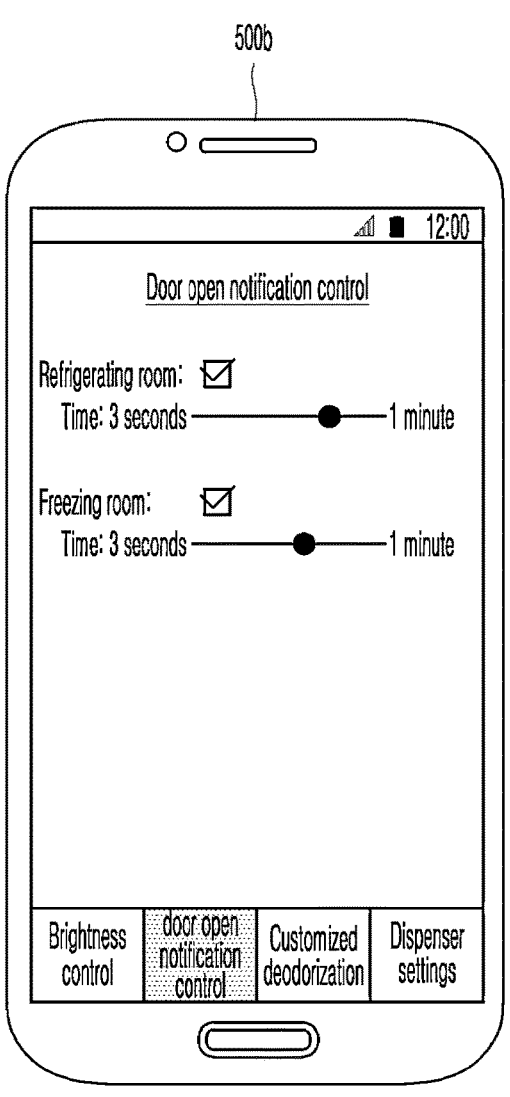

500a

Knock-on brightness/time control

Brightness: low ———————⬤——— high

Time: 3 seconds —⬤————————10 seconds

| Brightness control | door open notification control | Customized deodorization | Dispenser settings |

500b

Door open notification control

Refrigerating room: ☑
    Time: 3 seconds ——————⬤——1 minute

Freezing room: ☑
    Time: 3 seconds ——————⬤——1 minute

| Brightness control | door open notification control | Customized deodorization | Dispenser settings |

【FIG. 15】
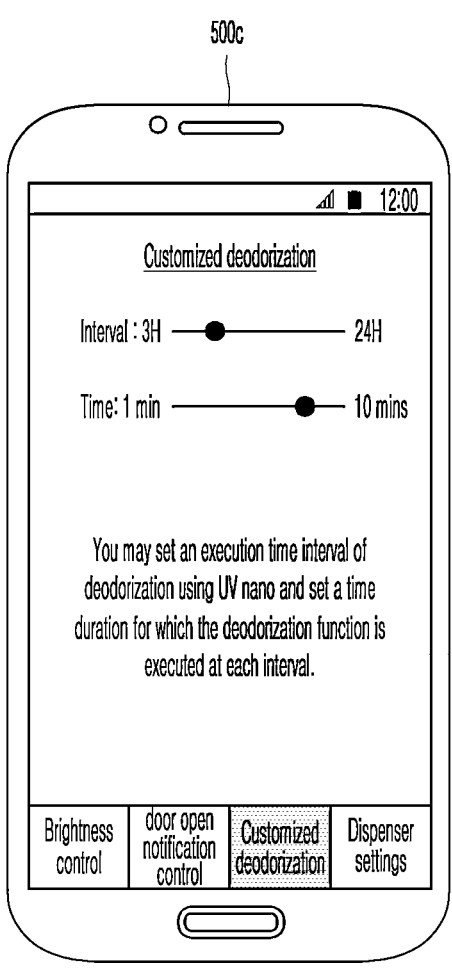
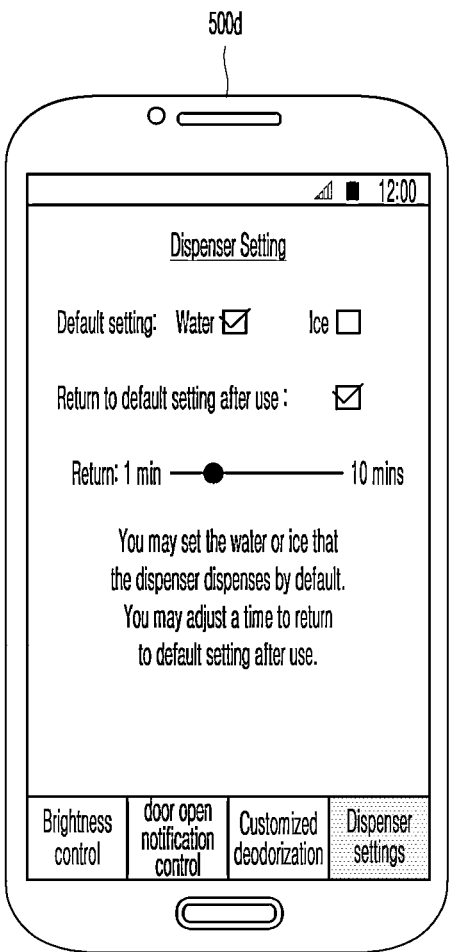

APPARATUS AND METHOD FOR MONITORING AND CONTROLLING ON BASIS OF DEVICE SPECIFICATIONS

CROSS-REFERENCE TO RELATED PATENT APPLICATIONS

This application is a U.S. National Stage Application under 35 U.S.C. § 371 of PCT Application No. PCT/KR2022/020198, filed Dec. 13, 2022, which claims priority to Korean Patent Application No. 10-2022-0021020, filed Feb. 17, 2022, whose entire disclosures are hereby incorporated by reference.

FIELD

The present disclosure relates to a device and method that performs monitoring and control based on a device specification.

DESCRIPTION OF RELATED ART

Electronic products are installed and operate in various environments. Changes may occur in a structure or a component of the product at the time of product shipment. For example, regarding TV, frequent turning on/off of the TV by a user may cause a malfunction in a power connector. In addition, when an air conditioner operates based on an external outdoor unit and mechanical/chemical/physical components, abnormal conditions may occur during an operation process.

Likewise, when a refrigerator is used very frequently, shock may be applied thereto mechanically or electrically. Various abnormalities may occur, such as changes in the refrigerant or changes in a compressor.

In other words, home appliances are not easily replaced, and it is difficult for users to easily move the home appliances outside due to their sizes and weights. As a result, there have been technical limitations in updating functions, monitoring the status of the product, or controlling the product remotely after the product shipment.

However, due to the development of various Internet technologies and software modules installed in the home appliances, schemes to overcome the technical limitations are being requested.

SUMMARY

The present disclosure is intended to solve the above-mentioned problems and is to provide a scheme for remotely setting up monitoring and control of home appliances.

Furthermore, the present disclosure seeks to present a technology in which transfer of information for monitoring and control of home appliances or a device setting scheme is performed based on reliability.

Furthermore, the present disclosure seeks to present technology that enables rapid response by allowing information set in home appliances to monitor or control the device to be easily replaced.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

Technical Solution

The server that performs monitoring and control based on a device specification according to an embodiment of the present disclosure includes a server storage module configured to store therein a certificate and a first device specification; and a server control module configured to perform a secure connection with an electronic device and transmit the first device specification to the electronic device, and then receive a first dataset generated by the electronic device according to a rule defined in the first device specification from the electronic device.

An electronic device that performs monitoring based on a device specification according to an embodiment of the present disclosure includes a device storage module configured to store therein a first device specification received from a server; and a device control module configured to perform monitoring according to a monitoring rule defined in the first device specification, to generate a first dataset based on the monitoring result, and to transmit the generated first dataset to the server.

An electronic device that performs control based on a device specification according to an embodiment of the present disclosure includes a device storage module configured to store a first device specification received from a server storing therein a certificate; and a device control module configured to: perform a secure connection with the server using the certificate; execute a control rule defined in the first device specification; generate first execution result data as a result of the execution of the control rule; and transmit the first execution result data to the server.

A method of performing monitoring and control based on a device specification according to an embodiment of the present disclosure includes receiving, by an electronic device, a first device specification from a server; and transmitting, by the electronic device, to the server, a first result generated by the electronic device according to a rule defined in the first device specification.

Technical Effect

In accordance with the present disclosure, monitoring and control of the home appliances may be performed remotely.

In accordance with the present disclosure, the transfer of information for monitoring and control of the home appliances or the device setting scheme is implemented based on reliability so that the device may be monitored or controlled without threat of hacking.

In accordance with the present disclosure, quick response or action may be made by making it easy to replace the information set in the home appliance to monitor or control the device.

The effects of the present disclosure are not limited to the effects as described above, and various effects of the present disclosure may be easily derived from the configuration of the present disclosure.

BRIEF DESCRIPTION OF DRAWINGS

FIG. 1 is a diagram showing a configuration of devices according to one embodiment of the present disclosure.

FIG. 2 is a diagram showing a configuration of a server according to one embodiment of the present disclosure.

FIG. 3 is a diagram showing a configuration of an electronic device according to an embodiment of the present disclosure.

FIG. 4 is a diagram showing a process of distributing a device specification according to one embodiment of the present disclosure.

FIG. 5 is a diagram showing a process of applying a device specification according to one embodiment of the present disclosure.

FIG. 6 is a diagram showing a process in which an electronic device operates based on a certificate and a device specification according to an embodiment of the present disclosure.

FIG. 7 is a diagram showing a monitoring and control process between an electronic device and a server according to an embodiment of the present disclosure.

FIG. 8 is a diagram showing a process of applying a monitoring rule of a device specification to monitor a product according to an embodiment of the present disclosure.

FIG. 9 is a diagram showing a process of applying a control rule of a device specification to control a product according to an embodiment of the present disclosure.

FIG. 10 is a diagram showing a configuration of a device specification according to one embodiment of the present disclosure.

FIG. 11 is a diagram showing a process in which an external device performs control of a product according to another embodiment of the present disclosure.

FIG. 12 and FIG. 13 are diagrams showing a configuration of a device specification when software is installed on an electronic device according to an embodiment of the present disclosure.

FIG. 14 and FIG. 15 are diagrams showing an interface through which an external device controls an operation of an electronic device according to an embodiment of the present disclosure.

DETAILED DESCRIPTIONS

Hereinafter, with reference to the drawings, embodiments of the present disclosure will be described in detail so that those skilled in the art may easily perform the embodiments. The present disclosure may be implemented in several different forms and is not limited to the embodiments described herein.

In order to clearly describe the present disclosure, contents unrelated to the description are omitted, and identical or similar elements are given the same reference numerals throughout the present disclosure. Furthermore, some embodiments of the present disclosure are described in detail with reference to illustrative drawings. In adding reference numerals to components in the drawings, identical components may have the same reference numerals as much as possible even when they are shown in different drawings. Furthermore, when describing the present disclosure, when it is determined that a detailed description of the structure or function known to the skilled person to the art may obscure the gist of the present disclosure, the detailed description thereof may be omitted.

When describing the components of the present disclosure, terms such as first, second, A, B, (a), and (b) may be used. These terms are only used to distinguish the component from another component, and the nature, sequence, order, or number of the component are not limited by the terms. When a component is described as being "connected," "coupled", or "combined" to another component, the component may be directly connected or coupled to the another component, or still another component may be "interposed" therebetween or the component may be "connected," "combined," or "connected" thereto via still another component.

Furthermore, in implementing the present disclosure, the component may be described in a subdivided manner for convenience of description. However, components may be integrated into one device or module, or one component may be implemented in a distributed manner into devices or modules.

Hereinafter, the electronic device described in the present disclosure is a device including a home appliance. DXI (Digital Transformation Interface/Information) as an input/output standard interface that enables continuous function extension of the home appliance is applied to the electronic device. As a result, remote diagnosis, monitoring, and control of the electronic device may be performed based on data.

In other words, after the electronic device is installed in a home, office, etc., diagnosis, monitoring, control, etc. thereof may be performed based on a standardized interface in a process of analyzing the user's usage behavior patterns and providing artificial intelligence functions based on the analysis result, or implementing upgradable product functions.

A manufacturer of the electronic device such as the home appliance or a company that provides continuous performance improvement services for the electronic device may request product status information to the home appliance in order to efficiently improve the performance of the electronic device. To this end, a server or monitoring/diagnosis/control tool may transmit a logic required for diagnosis and monitoring to the home appliance, and then the server or the electronic device processes the logic.

Afterwards, as a result of the logic processing, the home appliance may transmit feedback such as a setting predetermined value or a result value of the control to the server, the monitoring/diagnosis/control tool, etc. In this regard, the product's functionality may be expanded by standardizing the input/output (diagnosis/monitoring/control) of the home appliance.

Conventionally, adding new functions to a product has required a process of replacing the software installed on the product. This has been done in a process in which by the person in charge of replacing the software visits the site of the product in person, or the user familiarizes himself with a predetermined guide and then personally performs the work necessary to replace the software based on the guide. The conventional scheme causes increased replacement costs and inconvenience, and as a result, there have been limits to improving the functionality of released products.

Thus, according to the present disclosure, the electronic device may perform precise diagnosis/monitoring/control based on a product specification (hereinafter, referred to as a device specification). The electronic device may execute a rule defined in a specific state and at a specific time based on a predefined rule.

Therefore, even after the home appliance has been released, various services/apps/tools for the electronic device may be developed by applying the standardized interface thereto, and the product functions may be expanded without physical replacement of software.

The server that transmits information necessary for diagnosing, monitoring, or controlling the electronic device in accordance with the present disclosure may efficiently diagnose/monitor the status of the product using certified services, apps, tools, etc. Additionally, an interface is provided so that the server may stably control the devices under the assigned authority thereto.

According to an embodiment of the present disclosure, rule-based monitoring and control is provided to enable development of various application solutions after the product has been shipped, and data input and output to the product's storage is enabled.

FIG. 1 is a diagram showing a configuration of devices according to one embodiment of the present disclosure. A server 300 stores therein a device specification (product specification) and a certificate.

The electronic device 200 includes the home appliance, etc., and connects to the server 300 and downloads the device specification therefrom and installs the device specification therein. The electronic device 200 may include the home appliance or the electronic product that is installed in a user's residential space or office space and performs its own function. For example, the electronic device 200 may include a refrigerator, TV, a washing machine, a dryer, an air conditioner, an air purifier, a medical manager, a microwave oven, an electric range, an oven, etc. The electronic device 200 may include a communication interface or a communication unit required to perform wired or wireless communication. Furthermore, the electronic device 200 may provide information related to diagnosis/monitoring to the user through visual or auditory information output.

The electronic device 200 may perform operations required for monitoring, diagnosis, or control based on the installed device specification.

The server 300 may be composed of a module configured to stores therein the device specification and the certificate and a module configured to provides the device specification and the certificate. Depending on an implementation scheme, the module may be embodied as a separate device, and in this case, the server 300 may be composed of two or more devices (servers). In this case, the server 300 may operate as a server group, and the server group may be composed of a plurality of sub-server devices.

The server 300 may be a device that remotely manages, monitors, or controls the electronic device 200. The server 300 may be connected to the electronic device 200 through a communication network. In addition, the server 300 may be connected to an external device 500 in the communication manner. Thus, the server 300 in conjunction with the external device 500 may monitor, control, and diagnose the electronic device 200.

The server 300 may transmit the device specification to the electronic device 200 according to a preset download scheme or storage mechanism.

Furthermore, the server 30 may change the device specification of the electronic device 200 to change the monitoring and control scenario of the electronic device 200.

The control device 100 is a device that generates the specification and uploads the specification to the server 300. The control device 100 may be typically a computer, a mobile phone, a tablet, etc. managed by a business entity that manufactures and manages the electronic device 200. Furthermore, the control device 100 may access and read information transmitted from the electronic device 200 to the server 300 based on the device specification.

The external device 500 is a device that has received an authority from the server 300 or is linked with the electronic device 200 to monitor or control the electronic device 200. The external device 500 may be a device owned by the user. In an example, the external device 500 may include a smartphone, a laptop, a tablet PC, a smart TV, a smart watch, etc. Alternatively, the external device 500 may be a device which is external to the electronic device 200 and that diagnoses, monitors, or controls the electronic device 200. For example, one embodiment of the external device may include a separate external server or device which is external to the electronic device 200 and is owned/managed by a third party who has been delegated the authority to diagnose/monitor/control the electronic device 200 from the user or an administrator of the server 300.

The external device 500 may perform diagnosis, monitoring, and control of the electronic device 200 under the authority defined in the device specification installed on the electronic device 200. The external device 500 may be connected to the electronic device 200 in a communication manner. In this case, the external device 500 may directly perform diagnosis, monitoring, control, etc. on the electronic device 200.

Alternatively, the external device 500 may perform diagnosis, monitoring, control, etc. on the electronic device 200 via the server 300. In this case, the external device 500 may indirectly perform diagnosis, monitoring, and control on the electronic device 200.

FIG. 2 is a diagram showing a configuration of the server 300 according to one embodiment of the present disclosure. A server storage module 310 stores therein the certificate, the device specification, etc. Regarding the device specification, different device specifications may be provided depending on different models or detailed models of the electronic device. Accordingly, the server storage module 310 stores therein different device specifications based on the different models or detailed models of each home appliance. The device specification may be uploaded/updated, modified or changed by the control device 100.

The server storage module 310 stores therein the certificate, and the electronic device 200 may verify the server 300 based on the certificate in the process of transmitting the device specification later. The server storage module 310 may be a volatile and/or non-volatile memory, and may store therein the device specification as information related to monitoring, control, and diagnosis of the electronic device 200.

A server control module 350 may upload the device specification 310 or may perform a task defined in the device specification 310 on the electronic device 200. The server control module 350 may perform a secure connection with the electronic device using the certificate and may transmit the device specification to the electronic device 200 and then perform monitoring on the electronic device 200. In one embodiment, the server control module 350 may perform monitoring including receiving a dataset generated according to a rule defined in the device specification from the electronic device 200. A rule for receiving the dataset is defined in the device specification. A reception interval, a reception condition, etc. of the dataset may also be defined in the device specification.

Furthermore, the server control module 350 may perform a secure connection with the electronic device using the certificate, and may transmit the device specification to the electronic device 200 and then perform a control command defined in the device specification. In one embodiment, the server control module 350 may transmit a control command defined in the device specification to the electronic device 200 and then receive execution result data as a result of executing the control command from the electronic device 200. The authority of the control command or details about the control command are defined in the device specification. Furthermore, the control command may include a predetermined instruction provided in the software installed on the electronic device 200. When the software installed on the electronic device 200 is upgraded, the control command that the electronic device 200 may provide may also be added, modified, or deleted.

The server control module 350 may include a processor and an internal memory. The internal memory may store therein the device specification for monitoring, controlling, and diagnosing the electronic device 200. The processor may execute a server application.

The server control module 350 and the server storage module 310 may be implemented in one server or may be implemented in separate server devices, respectively. Furthermore, a plurality of server control modules 350 may be included depending on the model of the electronic device or a regional location of the electronic device. That is, the modules may be distributed across servers included in multiple server groups. Alternatively, the multiple server groups may include all of the modules in FIG. 2 and thus operate as a server.

The server control module 350 may include a server communication interface 355 as a sub-component thereof, and may transmit and receive data, information, or the result of performing the control command to and from the electronic device 200 using the server communication interface 355. In another embodiment, the server communication interface 355 may be separate from the server control module 350.

The server communication interface 355 may communicate with the electronic device 200, the control device 100, and the external device 500. The server communication interface 355 may perform communication using a wired scheme and/or a wireless scheme. The wireless scheme may include a short-range wireless communication scheme and a long-distance wireless communication scheme.

The server 300 is not limited to one device and includes multiple server groups.

FIG. 3 is a diagram showing a configuration of an electronic device according to an embodiment of the present disclosure. The electronic device 200 includes a home appliance that provides a predetermined function, such as a refrigerator, TV, an oven, a humidifier, a dishwasher, a dryer, a washing machine, and an air conditioner. The electronic device 200 includes software required to perform the predetermined function, a device storage module 210 that stores data, etc., and a device control module 250 that performs function control and upgrade. The configuration of the electronic device 200 is not limited to FIG. 3, and various additional components may be included in the electronic device 200.

A functional unit 280 includes all components that perform specific functions of the electronic device 200. For example, when the electronic device 200 is a refrigerator, a compressor, a motor, etc. that provide refrigeration/freezing functions may be components of the functional unit 280. When the electronic device 200 is a TV, an image output unit such as LCD/OLED may be a component of the functional unit 280. When the electronic device 200 is a washing machine, a washing bath, a water discharge means, etc. may be components of the functional unit 280.

The device control module 250 controls the functional unit 280 and identifies or receives the certificate and the device specification through communication with the server 300.

The device control module 250 may include a communication interface 255 as a sub-component, and may transmit and receive data or information to and from the server 300 using the communication interface 255. One embodiment of the communication interface 255 includes a modem.

The components as shown in FIG. 3 may transmit and receive data to and from each other through a local bus.

The device control module 250 may control overall operation of the electronic device 200. The device control module 250 may correspond to a microcomputer (Micom). Alternatively, the device control module 250 may operate based on firmware. Alternatively, the device control module 250 may be composed of one or more processors. The device control module 250 may be software installed in the electronic device 200 or the device control module 250 may include software. When the device control module 250 is software or includes software, the function that the device control module 250 may provide may change depending on software upgrade.

Although not shown in the drawing, the device control module 250 may include a processor and an internal memory. Additionally, the device control module 250 may be composed of a plurality of modules depending on the function of the electronic device 200 as the home appliance.

The device control module 250 may include one or more of a central processing unit (CPU), an application processor, or a communication processor. The device control module 250 may operate based on firmware to execute one or more commands related to control of the electronic device 200.

The device control module 250 performs a secure connection with the server 300 using the certificate, receives the device specification from the server 300, and stores the device specification in the device storage module 210. Furthermore, the device control module 250 generates a dataset according to the rule defined in the device specification and transmits the dataset to the server 300.

The device control module 250 compares a monitoring authority or a control authority of the device specification received from the server with an authority of the certificate. The device control module 250 generates data to be transmitted to the server based on monitoring setting or control setting as a valid authority in the device specification. In one embodiment, the device control module 250 may generate a dataset including a monitoring result value or generate execution result data as the result of executing the control command. Furthermore, a transmission rule (number of transmissions, transmission interval, transmission condition, etc.) of the generated result is defined in the device specification. The device control module 250 may transmit the dataset and the execution result data according to the transmission rule.

The device control module 250 may continuously receive and store therein a first device specification, a second device specification, etc. from the server 300. In one embodiment, the device control module 250 may store therein the second device specification in place of the first device specification. Alternatively, the device control module 250 may store both the first device specification and the second device specification in the device storage module 210 and deactivate the first device specification. Then, the deactivated first device specification may be deleted from the device storage module 210 after a predetermined period of time has elapsed.

In one embodiment, the device storage module 210 may be embodied as an internal memory of the electronic device, which may be a volatile and/or a non-volatile memory. The internal memory may store therein firmware and one or more instruction related to control of the electronic device 200. The device storage module 210 stores therein the certificate and the device specification.

The communication interface 255 may communicate with the server 300.

In particular, the communication interface 255 may receive various data, programs, etc. including the device specification from the server 300. The communication interface 255 may transmit and receive data in a wired scheme and/or a wireless scheme.

According to an embodiment, the communication interface 255 may be embodied as a short-range wireless communication module configured to implements short-range wireless communication. The short-range wireless communication module may be a wireless communication module based on WiFi (wireless fidelity), BLUETOOTH (or other short-range wireless technology for data exchange), radio frequency identification (RFID), infrared data association (IrDA), ultra-wideband (UWB), ZigBee, etc.

When the communication interface 255 is a short-range wireless communication module, an access point (not shown) may be provided in the user's living space. The access point may be a device that relays wireless communication between the server 300 and the communication interface 255. For example, when the communication interface 255 is a WiFi module, the access point may be a WiFi router.

According to another embodiment, the communication interface 255 may be a long-distance wireless communication module configured to implements long-distance wireless communication. The long-distance wireless communication module may be a wireless communication module based on code division multiple access (CDMA), frequency division multiple access (FDMA), time division multiple access (TDMA), orthogonal frequency division multiple access (OFDMA), single carrier frequency division multiple access (SCFDMA), 5G, etc.

The communication interface 255 may correspond to a microcomputer for controlling communication. The communication interface 255 may operate based on firmware.

The functional unit 280 may be a component that performs a unique function provided by the electronic device 200. For example, the unique function may be a washing function of a washing machine, a drying function of a dryer, an air conditioning function of an air conditioner, an air purifying function of an air purifier, etc.

A user interface 290 may provide information about the operating state of the electronic device 200 to the user. In an example, the user interface 290 may include a display module and a speaker module. In one example, the user interface 290 may receive an input for controlling the operation of the electronic device 200 from the user.

The communication interface 255 communicates with the server 300 and downloads the device specification to be stored in the electronic device 200 from the server 300. The electronic device 200 stores the device specification in the device storage module 210.

Figure 4:
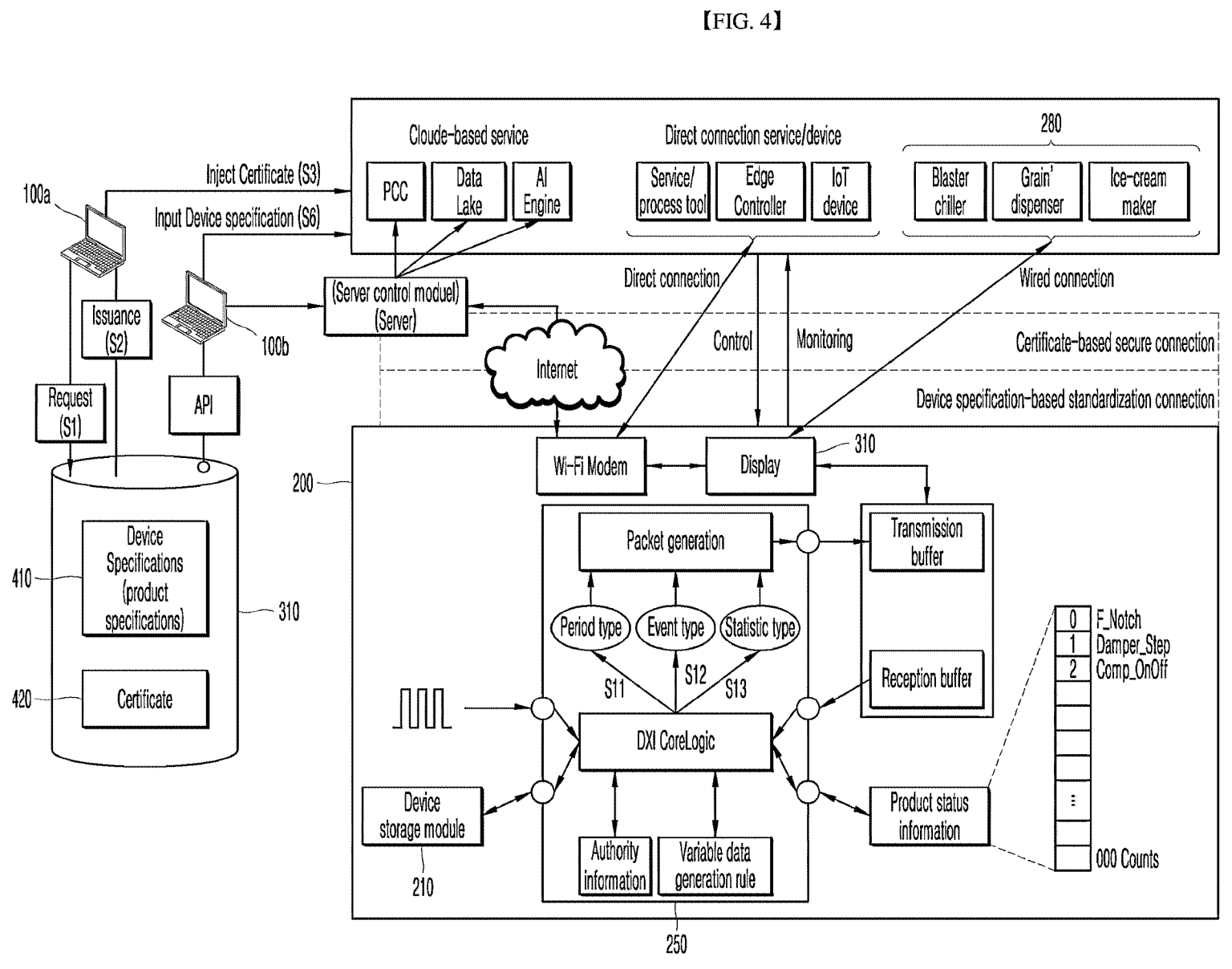

FIG. 4 is a diagram showing a process of distributing the device specification according to one embodiment of the present disclosure. FIG. 4 shows a process in which a home appliance standard interface that minimizes SW change of product and allows continuous expansion of the function of the home appliance as the electronic device operates. When the device specification is applied, a safe and flexible communication channel and product specification information that may develop new services/functions external to the electronic device may be implemented.

A device specification 410 is a product specification applied to a product and may be configured in a file form. The device specification 410 refers to a definition of what the product may do, and may be applied to settings or performance of product monitoring, control, product settings, restrictions, language pack, etc.

The device specification 410 includes a rule for monitoring the status of the component of the electronic device 200 and control information about the component of the electronic device 200.

A certificate 420 refers to a definition of an authority of a connection service. In other words, the certificate may be configured in a form of a file that defines an authority level at which the server or the external device having the certificate can perform on the electronic device. The certificate 420 may include information defining an expiration date until which the server or the external device may be linked to the product using the service. The certificate may be discarded when necessary. The server 300 and the electronic device 200 may perform a secure connection to each other using the certificate 420.

The server 300 may compare an authority of each device specification with the authority of the certificate in a process of registering and storing the certificate 420 and each device specification 410. For example, when the server control module 350 receives the first device specification from the control device 100, the server control module 350 may compare a monitoring authority or a control authority of the first device specification with an authority of the certificate and determine whether the authority of the first device specification is valid.

It is assumed that the certificate includes only the monitoring authority and does not include the control authority. When both the monitoring rule and the control rule are included in the first device specification that the server 300 has received from the control device 100, the server 300 excludes the control rule from the first device specification.

The device specification 410 and the certificate may be stored in the server storage module 310 of the server 300. A first control device 100a requests a certificate so that the server control module 350 which requires the certificate 420 may access the electronic device using the certificate in S1. The first control device 100a receives the certificate in S2 and injects (inputs, stores) the certificate 420 into a server group (for example, the server control module) providing a predetermined cloud-based service in S3. Afterwards, the servers (for example, the server control module 350) of the server group that provides the cloud-based service may communicate with the electronic device according to the certificate of S3 and perform tasks defined in the certificate.

The cloud-based service which the servers in the server group may provide include PCC, data lake, and AI Engine. PCC (Proactive Customer Care) refers to a service in which the server control module 350 actively proceeds the usage pattern, the status and management of the electronic device 200.

Data lake refers to a service in which the electronic devices store therein various data produced by the multiple electronic devices according to a protocol defined in the device specification or defined in another manner. The PCC service may provide a service that manages and sets matters such as the generation scheme, the generation time, and the transmission time of the data to be stored in the data lake.

The AI engine service may determine more effective device settings or more effective device operations based on various information generated by the electronic device.

The server control module 350 (or the server) which focuses on providing the cloud-based service connects to the electronic device 200 through the Internet and performs the PCC, data lake, and AI engine tasks within the scope of the authority granted through the certificate.

In one embodiment, the server control module 350 receives the device specification 410 generated by a second control device 100*b* in S6 and then transmits the device specification 410 to the corresponding electronic device 200. The electronic device 200 together with the server control module 350 may perform tasks such as monitoring, diagnosis, and control based on the new device specification 410.

For example, in one embodiment, the device control module 250 may be embodied as a core module configured to operates using the device specification. The device control module 250 generates packets using a core logic, authority information, and a variable data generation rule in S11, S12, and S13. In this regard, the packet may be generated in a periodic manner (a period of 1 second, 5 seconds, etc.) in S11, in an event manner (event of door opening or closing) in S12, and in a statistical manner (a water intake volume for 1 minute, 3 minutes, 5 minutes) in S13.

The core logic may operate according to a clock signal. The core logic may identify the certificate 420 and store the authority information of the server control module 350. The core logic may store the certificate 420 and the device specification 410 using the device storage module 210, for example, data storage. The core logic may generate information using the device specification 410. For example, the core logic may generate the packets in the packet generation manners (S11, S12, and S13) using a variable data generation rule.

The electronic device 200 may include a Wi-Fi modem to communicate with an external server. The Wi-Fi modem may be a separate communication unit and may be a component of the electronic device 200. Alternatively, according to another embodiment, the Wi-Fi modem may be included as a sub-component of the device control module 250 of the electronic device 200.

The user interface 290 which displays the operating status of the electronic device 200 may display a current state or an operating state of the internal functional unit 280. Regarding the refrigerator as an example of the electronic device 200, the functional unit 280 may include components such as a blaster chiller, a grain dispenser, and an ice cream maker. Sub-components of each of the user interface 290 and the functional unit 280 may be connected to each other in a wired manner, and the user interface 290 may display an operating status of the functional unit 280.

In one example, the device control module 250 may transmit and receive data using a transmission buffer and a reception buffer. Furthermore, the device control module 250 may store therein product status information in an accumulating manner, and generate packets based on the accumulated product status information, and transmit the packets to the server control module 350.

In one embodiment in which the electronic device is embodied as a refrigerator, the product status information includes notch information (F_Notch, R_Notch) of each of refrigeration and freezer compartments, a damper step (Damper_Step), an on/off status (Comp_OnOff) of a compressor, etc. The current state or the accumulated state of the components of the electronic device 200 is included in the product status information.

The electronic device 200 may collect the status information, generate the packet according to a rule set in the device specification 410, and transmit the generated packet to the server control module 350. Furthermore, the electronic device 200 may control the product according to a command from the server control module 350, such that scenario-based control of the electronic device may be performed.

The transmission buffer buffers the packet to be transmitted for a predetermined period of time, and the reception buffer buffers the received packet for a predetermined period of time.

In one example, the Wi-Fi modem may connect to an external service or device to provide information or perform control. Types of the external services/device include service/process tools, edge controllers, and other IoT devices.

The server control module 350 may communicate with the electronic device 200 and perform tasks such as control/monitoring/diagnosis based on the certificate 420 and the device specification 410. Using the certificate 420, a secure connection enabling TLS/mutual authentication and authority control is established between the server control module 350 and the electronic device 200. Furthermore, the device specification 410 is used such that the server control module 350 and the electronic device 200 may operate using a standardized I/O interface.

When the configuration as shown in FIG. 4 is applied, a standardized interface between end-to-end devices that are linked to the home appliance as the electronic device may be provided. Therefore, when adding a new feature to the electronic device 200, the device specification may be installed without adding a separate new protocol. Conventionally, when adding a new feature, a new protocol had to be added. However, according to an embodiment of the present disclosure, the device specification may be commonly provided such that the electronic device 200 may perform an operation upgraded based on a standardized interface for monitoring/diagnosis/control.

Furthermore, the device specification may reflect detailed differences between models, thereby allowing detailed monitoring and control on each model.

Conventionally, most of platforms that have been applied to the home appliances based on IoT standards have provided a common region of manufacturers as API and thus have provided a very limited level of input and output. However, when using the device specification, the device specification may be set appropriately for a corresponding model such that the input and output of the electronic device 200 may be controlled in a variety of ranges.

FIG. 5 is a diagram showing a process of applying the device specification according to an embodiment of the present disclosure.

The control device 100 generates the first device specification in S20 and transmits the first device specification to the server 300 in S21. The server 300 stores therein the first device specification and then transmits the first device specification to the electronic device 200 to which the first device specification is to be applied in S23. In this process, the server 300 and the electronic device 200 may provide certificate-based TLS/mutual authentication for link with the product, and may extract the authority level during handshaking and may set a product authority level.

In other words, the electronic device 200 provides only performance and result of monitoring and control corresponding to the thus-identified authority level. For example, when the device specification includes contents related to level 5 monitoring or control, but the server 300 has an authority level of level 3, the content of the device specification related to level 5 monitoring/control is not applied to the electronic device 200.

In process S23, the electronic device 200 identifies whether the specification information registered in the server

300 has been updated according to a preset period. Upon identification that the specification information registered in the server 300 has been updated, the electronic device 200 updates the monitoring/control rule information and the authority level. That is, the electronic device 200 may identify whether a new device specification has been updated in the server 300 according to a preset period. Upon identification that the new device specification has been updated in the server 300, the electronic device 200 may receive the updated device specification from the server 300 and store the updated device specification in the device storage module. In this regard, the preset period may vary depending on the type of the electronic device 200, and the preset period may also be newly designated in the device specification.

For example, the electronic device 200 may identify whether the device specification has been updated every 12 hours through the server 300. Furthermore, upon receiving the new device specification, the electronic device 200 may identify that an update identification period specified in the new device specification has been changed to 24 hours. Thus, the electronic device 200 may identify whether the device specification has been updated every 24 hours through the server 300.

In other words, the device control module 250 of the electronic device 200 may execute monitoring and control commands under the authority level of the device specification and the certificate of the external device such as the control device 100 or the server 300.

As a result, the electronic device 200 generates monitoring/diagnosis/control-related data or performs indicated monitoring/diagnosis/control operation based on the first device specification in S24. Then, the electronic device 200 transmits, to the server 300, a result (e.g., a first dataset regarding monitoring and diagnosis, and first execution result data regarding control) composed of data calculated as a result of performing the monitoring/diagnosis/control based on the first device specification in S25. The server 300 stores therein the first dataset/first execution result data in S26.

Since the first device specification has been applied to multiple electronic devices, the result transmitted from the electronic devices 200 are stored in the server 300 in an accumulated manner. Afterwards, the control device 100 requests and receives the first dataset or the first execution result data in S27. The control device 100 analyzes the first dataset or the first execution result data calculated based on the first device specification. Upon determination based on the analysis result that the first device specification needs to be changed, the control device 100 generates the second device specification in S30.

The second device specification indicates a device setting that is different from that of the first device specification. In one embodiment, the second device specification may have change in a time interval at which monitoring of the electronic device 200 is performed, or change in an event condition such that data is generated according to a specific event. Additionally, the second device specification may have change in the statistical scheme of the statistical data generated from the electronic device 200.

When the second device specification has been generated, the control device 100 transmits the second device specification to the server 300 in S31, and the server stores therein the second device specification in S32. As described above in the process S23 to S27, the electronic device 200 receives the second device specification from the server in S33, and then generates data related to monitoring/diagnosis/control or perform indicated monitoring/diagnosis/control operation based on the second device specification in S34.

Then, the electronic device 200 transmits a second dataset or second execution result data to the server 300 in S35. The server 300 stores therein the second dataset or the second execution result data in S36 and then transmits the second dataset or the second execution result data to the control device 100 in response to a request from the control device 100 in S37.

This process may be repeated.

The process in FIG. 5 may be summarized as follows. The server 300 and the electronic device 200 perform a secure connection to each other using the certificate. Then, the electronic device 200 receives the first device specification from the server 300 in S23.

The electronic device 200 transmits to the server 300 the first dataset generated according to the monitoring rule defined in the first device specification or the first execution result data as the result of executing the control command in S24 or S25. The electronic device 200 may compare the monitoring authority or the control authority of the first device specification with the authority of the certificate and may apply the monitoring or control setting as a valid authority in the first device specification to generate a result.

Then, the new second device specification is uploaded to the server in S31. Accordingly, the electronic device 200 receives the second device specification from the server 300 and stores the second device specification therein in S33. Then, the electronic device 200 compares the monitoring authority or control authority of the second device specification with the authority of the certificate and applies the monitoring or control setting as a valid authority in the second device specification to generate the second dataset or the second execution result data in S34. Afterwards, the electronic device 200 transmits the second dataset or the second execution result data to the server in S35.

As shown in FIG. 5, in an embodiment in which the electronic device 200 is embodied as the home appliance, the electronic device 200 allows the external device (server, control device) to monitor/control the product. The electronic device 200 may transmit data related to monitoring/control/diagnosis, etc. to the server 300, based on the device specification that provides product information.

The device specification may be transmitted to the product and set therein. Furthermore, the device that has acquired the certificate through a preset API may install the device specification in the product and may identify the dataset.

FIG. 6 is a diagram showing a process in which an electronic device operates based on a certificate and a device specification according to an embodiment of the present disclosure.

The electronic device 200 connects to the server 300 based on authentication and receives the authority level of the server in S41. For example, the electronic device 200 may identify whether it is connected to an external linked system such as a server or a third party based on a certificate and receive the authority level during the mutual authentication process.

When there is a server in charge of authentication, the authentication server may grant an authority level to the linked system based on the contents of the task, such as monitoring/control of the linked system. Furthermore, when the authentication server issues the certificate, the encrypted authority level may be added to the meta information of the certificate (e.g. X.509).

The server responsible for authentication may be provided separately, and the server 300 may also provide an authentication service.

Afterwards, the server or an external third-party device may provide the certificate to the electronic device 200 in the process of being linked with the electronic device 200. In one embodiment, the certificate may be transmitted to the electronic device 200 in a Transport Layer Security (TLS) handshaking manner. When certificate transmission and connection have been performed, the electronic device 200 may receive the authority level of the server or the external third-party device.

Then, the electronic device 200 receives the device specification from the server or the external third party device, and identifies and parses a monitoring/control item based on the device specification in S42. For example, the electronic device 200 identifies the monitoring/control performed on the product by the server or the external third-party device and the authority level thereof, using the information described in the device specification. To this end, the electronic device 200 may identify and parse each monitoring/control item in the device specification.

Further, the electronic device 200 identifies whether the server or the third-party device has an appropriate authority level for the rule or the task presented in the device specification. When there is a monitoring/control item that requires an authority level higher than the authority level of the certificate, the electronic device 200 does not reflect the contents of the item.

The electronic device 200 which has downloaded the rule predefined in the device specification automatically executes the rule according to a specific condition/time. The electronic device 200 transmits the dataset as the result of monitoring or the execution result data as the result of executing the control command to the server or the third-party device in S43. The device control module 250 may generate a dataset including a monitoring result according to the monitoring time, interval, condition, etc. as described in the device specification.

Furthermore, the device control module 250 may control the electronic device 200 according to the control item as described in the device specification and generate execution result data including a result of controlling the device.

The dataset and the execution result data may be transmitted to the server or the third-party device according to the transmission scheme (transmission interval, the number of transmissions, etc.) as described in the device specification.

The device specification may be changed. The changed device specification may be transmitted through the server 300 or the external third-party device, and the electronic device 200 may perform steps S41 to S43 and replace the device specification.

According to the above-described embodiment, the product status information may be efficiently obtained, the product data may be efficiently managed, or the product may be efficiently controlled during the life cycle of the home appliance. In other words, the server side may adjust the number, the amount, and the type, etc of generation or transmission of dataset or execution result data so as to suit the characteristics or change situation of each product, and may stop the dataset transmission or stop the execution of the control command or resume the transfer of the dataset and the execution of the control command in an appropriate manner for the situation.

This allows the product's functionality to be expanded without changing the software. Furthermore, not only the server 300 but also the third-party device may obtain the certificate to monitor or control the product.

FIG. 7 is a diagram showing a monitoring and control process between an electronic device and a server according to an embodiment of the present disclosure.

The electronic device 200 may transmit, to the server 300, a dataset resulting from monitoring the status information of internal components (sensors, parts, etc.) based on the device specification in S51.

That is, the server 300 performs monitoring using the dataset in S51. The server 300 may diagnose or control the electronic device 200 based on PCC using various data provided from the electronic device 200 in S52. Furthermore, the server 300 may perform the diagnosis based on a scenario set for each electronic device 200 in S53.

When the usage pattern of the electronic device 200 is accumulated as a result of monitoring the electronic device, the server 300 may personalize the operation of the electronic device 200 using the AI engine in S54. In addition, the server 300 may generate a command to diagnose or control the electronic device using an app that is associated with the electronic device in S55. Furthermore, a scheme in which the server 300 controls the electronic device 200 may include a scheme in which the server 300 controls the electronic device 200 without using the device specification. For example, the server 300 may call a predetermined control command provided from the electronic device 200.

Furthermore, the device specification stores therein parameter values required for the electronic device 200 to execute the control command. When the server 300 calls the control command, the electronic device 200 applies the parameter values of the device specification to execute the control command. The electronic device 200 may transmit the result (ACK/NACK/authority error, etc.) of executing the control command to the server 300. The result obtained by the electronic device 200 executing the control command may be transmitted to the server 300 from the electronic device 200 immediately after executing the control command. Alternatively, the electronic device 200 may perform predetermined monitoring, and may include the result obtained by performing the control command in the dataset which is the result of monitoring, and then transmit the combination of the dataset to the server 300.

In the process of S52 to S55, the server 300 may generate a control command suitable for the electronic device 200 and transmit a new device specification based on the generated control command to the electronic device 200 in S56. A central control module of the electronic device 200 may repeat a process of controlling each of the components or collecting the status information of each component based on the new device specification and transmitting the dataset to the server 300 as in S51.

For example, it is assumed that among the components constituting the electronic device 200, there are Part 1 and Part 2 as the components subject to monitoring and control based on the device specification. In this case, each of Part 1 and Part 2 may generate information on the result state (state 1), operation state (state 2), and error state (state 3) sensed during the operation process, respectively. This information constitutes the dataset during the monitoring process and is transmitted to the server 300.

The server 300 may perform the operations of S52 to S55 and control the electronic device 200 using the status information of Part 1 and Part 2 of the electronic device 200 in S56. When applying the above-described processes, various and variable diagnosis/monitoring/control of the electronic device 200 as the product may be performed. Additionally, a flexible software structure that may apply various usage scenes or scenarios to the electronic device 200 may be implemented in the electronic device 200.

After the electronic device 200 is manufactured and sold, the software installed on the electronic device 200 may be continuously changed or updated for function improvement and quality control. Therefore, when a standard interface based on the device specification (product specification) is applied to the electronic device 200, the degree of freedom of software update using the standard interface may increase.

Furthermore, the server 300 or the control device 100 may variably generate input data necessary for performing diagnosis/monitoring/control according to the situation. To this end, the server 300 or the control device 100 may include a logic of such as period, event, statistics, or scenario-based in the device specification so that the monitoring data may be utilized in various ways.

Furthermore, the server 300 or the control device 100 may combine functions provided by software installed on the electronic device 200 with each other and control the electronic device 200 using the combination of the functions. To this end, the server 300 or the control device 100 may maintain an up-to-date list of various function calls required for control so as to be in compatibility with software installed or upgraded on the electronic device 200. Furthermore, executable control rule for each version may be included in the device specification so that multiple electronic devices 200 with various versions of software installed thereon may be controlled.

Since monitoring and control functions are activated based on the device specification, remote diagnosis and control from the server 300 is realized. Furthermore, when the accumulated data transmitted from the electronic device 200 is input to the AI engine to train the AI engine, personalization through the customer's pattern of using the electronic device may be achieved and the status of the device may be reflected such that user-oriented operation and management of the electronic device 200 may be realized.

In addition, because step-by-step authentication through the certificate may be performed on the server or the external third-party device which provides the device specification or performs monitoring/controlling the product, authority to monitoring information about electronic devices and authority to control electronic devices may be set during in the monitoring/control process.

When applying the device specification, monitoring/control is performed by providing the standard interface without updating the software of the electronic device 200. Thus, the efficiency of monitoring and control of the electronic device 200 may be increased. Furthermore, when the software of the electronic device 200 is updated or upgraded, the device specification provides the standard interface for monitoring/control so that the changed function may be used.

In accordance with another embodiment of the present disclosure, the authority for acquiring monitoring information about the electronic device and the electronic device may be controlled during the monitoring/control process without the certificate being provided or transmitted from the server.

For example, the electronic device may basically store server information related to monitoring or control within the product. When the electronic device is first connected to a network, the electronic device connects to the server using the stored server information. The information may be stored immutably within the electronic device. Alternatively, the information may be changed in a predetermined authorized process and then stored therein.

Furthermore, the server may be composed of a plurality of server groups, and the electronic device connects to a connection server according to the information about the server (connection server) stored in the electronic device. The connection server may provide, to the electronic device, an address of a server (device specification server) that is configured to provide the device specification to the electronic device. Alternatively, the electronic device and the device specification server may transmit and receive, to and from each other, the device specification, the dataset, the result of executing the control command, etc. via the connection server. Information about the connection server may be maintained in a stored state in the electronic device and may be updated using the above-described authenticated process.

For example, the connection server may transmit a command to change the information about the connection server to information about another management server to the electronic device. Then, the electronic device updates the information about the management server with the information about the new connection server. Afterwards, the electronic device may connect to the new connection server (previous management server) and receive the device specification therefrom.

FIG. 8 is a diagram showing a process of applying the monitoring rule of the device specification to monitor the product according to an embodiment of the present disclosure.

The server 300 modifies and registers the first device specification in S61. In this regard, the first device specification may include a model name or identification information (ID) of the electronic device to which the first device specification is to be applied. The electronic device 200 periodically connects to the server 300 to identify the update of the device specification in S62. That is, the electronic device 200 identifies whether a new device specification has been registered at a regular time interval (12 hours, 24 hours, etc.). Then, the electronic device 200 downloads the first device specification from the server 300 in S63. The electronic device 200 stores therein and updates the first device specification in S64.

Afterwards, the electronic device 200 generates a first dataset according to the monitoring item, period, condition, etc. as defined by the first device specification in S65. The monitoring rule defined in the first device specification include a periodic rule, a conditional rule, or a request-based rule.

In one embodiment, the electronic device 200 may generate the monitoring result according to a predetermined period (1 second, 2 seconds, . . . , 1 hour, etc.). In one embodiment, the electronic device 200 may generate the monitoring result according to a specific rule (such as when the refrigerator door is opened or overcooled). In one embodiment, the electronic device 200 may generate the monitoring result according to a request from the server 300. The electronic device 200 transmits the first dataset to the server 300.

Furthermore, the electronic device 200 may perform monitoring according to the first device specification to the external device 500. For example, the electronic device 200 may generate a second dataset according to the monitoring item/period/condition as defined by the first device specification in S67 and transmit the second dataset to the external device 500 in S68.

In this case, communication between the external device 500 and the electronic device 200 may be performed based on a local connection based on a local area network. Alternatively, both communication between the external device 500 and the electronic device 200 and communication between the server 300 and the electronic device 200 may be performed based on a connection through an Internet communication network.

The monitoring rule included in the device specification for monitoring the electronic device may be classified into the periodic rule, the conditional rule, request based rule, etc. This rule may be written in the device specification and delivered to the electronic device. The request based rule may allow the monitoring result to be transmitted immediately upon request from the server 300 or the external device 500.

In this regard, information necessary for transmitting the monitoring result to the external device 500 may also be stored in the device specification. In one embodiment, the device specification may include information about an external device as a receiving device of receiving the dataset as the monitoring result. Furthermore, the electronic device may generate a dataset as the result of monitoring and transmit the dataset to an external device pre-defined in the device specification.

The dataset may include the result of monitoring the electronic device. Furthermore, the dataset may include the result of previously performing the control command. That is, the electronic device 200 may transmit the result of executing the control command to the server 300 or the external device 500 separately from the dataset, or may include the execution result of the control command into the dataset and may transmit the dataset including the result of executing the control command to the server 300 or the external device 500.

The external device includes a terminal owned by the user of the electronic device or an external server owned by a third party entrusted with the management of the electronic device.

FIG. 9 is a diagram showing a process of applying a control rule of the device specification to control a product according to an embodiment of the present disclosure. Steps S61 to S64 are performed in the same manner as those in FIG. 8. Thus, reference to the descriptions about FIG. 8 will be made.

After performing step S64, the electronic device 200 stores therein the control authority and the scenario defined in the first device specification and sets the control authority and the scenario in S71. The control rule defined in the first device specification includes a rule for changing setting values in the electronic device 200 or a scenario execution rule stored in the electronic device. Executing the control rule means executing a control command that constitutes the control rule, or receiving a control command instructing to execute the control rule from the server or the external device to execute the control rule. According to one embodiment of the present disclosure, the control rule may be indicated by the control command in an identical manner with each other. Furthermore, according to another embodiment of the present disclosure, a portion of the control rule may be indicated by the control command. Furthermore, according to one embodiment of the present disclosure, multiple control rules may be dictated by a single control command.

Afterwards, when the server 300 transmits a first control command defined in the first device specification in S72, the electronic device 200 checks the control authority of the server 300. When the server 300 has legitimate authority, the electronic device 200 performs the first control command in S73. Thereafter, the electronic device 200 transmits first execution result data including the result of executing the first control command to the server 300 in S74.

In one example, the external device 500 may also transmit a second control command to the electronic device 200 in S75. Then, the electronic device 200 may check the control authority of the external device 500 and perform the second control command in S76. Then, the electronic device 200 may transmit second execution result data including the second control command execution result to the external device 500 in S77.

Furthermore, the electronic device 200 may perform the scenario without receiving the control command. That is, when the condition of the scenario is met, the electronic device 200 may perform a command defined in the scenario and control the operation of each of the components within the electronic device.

The scenario refers to a set of control commands combined with each other to continuously control the product by connecting individual controls of the components of the electronic device 200 to each other on the time axis. Furthermore, condition information necessary for executing the control command may also be included in the scenario.

The server 300 or the external device 500 may transmit the control command according to a given authority level. In this case, the authority level of each of the devices may be set to vary based on the certificate.

As mentioned in FIG. 8, the dataset containing the result of monitoring the product may optionally include the result of previously performing the control command. That is, the electronic device 200 may transmit the result of executing the control command to the server 300 or the external device 500 separately from the dataset, or may include the execution result in the dataset and transmit the dataset including the result of executing the control command to the server 300 or the external device 500.

FIG. 10 is a diagram showing a configuration of the device specification according to one embodiment of the present disclosure. The device specification 410 includes monitoring rule (an item to be monitored, the monitoring scheme, the monitoring period, the monitoring authority, etc.) and the control rule (an item to be controlled, the control scenario, the control authority, the control scheme, etc.). Additionally, the device specification 410 includes product restrictions, that is, restrictions on a communication speed, a minimum monitoring period, a maximum data size, the authority, etc. of the electronic device 200.

In one embodiment, the device specification may be generated in a byte converting scheme. Using an editing tool, the device specification that includes human-readable settings may be generated. Further, data in a string form (monitoring rule and authority information, JSON format) may be converted into the device specification including setting values such as hexadecimal numbers using the byte conversion scheme. In this regard, the device specification may be dumped directly into a memory (device storage module) of the electronic device 200 without a separate parsing process.

The user converts the monitoring and control items into the human readable data using the editing tool and directly includes the human readable data into the device specification. In this case, the electronic device 200 may require a separate memory to parse the values as described in the device specification.

On the contrary, according to an embodiment of the present disclosure, when the device specification including the hexadecimal setting values converted in the byte conversion scheme is downloaded to the electronic device 200, the electronic device 200 may perform monitoring and control directly using the device specification dumped in the memory. In other words, the electronic device 200 may process the DXI logic when the device specification downloaded from the server 300 is dumped directly into the memory.

The device specification 410 may include a value obtained by masking each of the monitoring setting information and the authority information.

The device specification 410 is stored in the server 300, and the communication interface (I/F) 255, for example, a modem of the electronic device 200 communicates with the server 300 and downloads the device specification 410 therefrom in S82. The device control module 250 may perform initial setup of the product and the specification update using the device specification 410 received using the modem in S83.

Afterwards, monitoring may be performed on the product according to the device specification and then, the monitored value (dataset) may be transmitted to the data lake in S84. The server 300 or the external device 500 may identify the state of the electronic device 200 using the dataset accumulated in the data lake.

Then, the server 300 or the external device 500 transmits the control command using service/process tools, etc. in S85. The device control module 250 may change a specific setting value or perform a scenario according to the control command. In another example, the server 300 or the external device 500 may perform the initial product setup or monitoring using the service/process tools, etc.

FIG. 11 is a diagram showing a process in which an external device performs control of a product according to another embodiment of the present disclosure. Unlike FIG. 9, FIG. 11 shows the process in which the external device 500 transmits the control command to the electronic device 200 via the server 300.

The control command requires that the electronic device 200 should have software installed therein that may perform the control command. For example, the server 300 modifies the first device specification for Funct_A as a new function and registers the modified first device specification in S61*a*. The electronic device 200 periodically identifies whether the device specification of the server 300 has been updated in S62*a*. As a result, the server 300 downloads the new first device specification to the electronic device in S63*a*.

The electronic device 200 stores therein and updates the downloaded first device specification in S64*a*. Then, the electronic device 200 performs a notification process to inform the external device 500 of information related to the update in S65*a*. This notification process may be implemented as i) a process in which the electronic device 200 guides the update and availability of the device specification on the speaker or screen, or ii) a process in which the server 300 guides the update of the device specification and its availability on the app installed on the external device 500.

Afterwards, the external device 500 executes the app in S64*a* and transmits the first control command to the server 300 to instruct the electronic device 200 to execute the control command defined in the control rule provided in the new device specification in S91. Then, the server 300 transmits the first control command to the electronic device 200 in S92. The electronic device 200 checks whether the external device 500 has control authority in relation to the first control command. Upon determination that the external device has the control authority, the electronic device 200 may execute the first control command in S93.

Afterwards, the electronic device 200 transmits first execution result data as the result of executing the first control command to the server 300 in S94. The server 300 transmits the received first execution result data to the external device 500 so that the external device 500 may check the execution result of the control command in S95.

When the device specification changes in a scheme of using a function provided by software, the operation of the electronic device 200 may be controlled or monitored through the device specification without updating the software.

In the embodiment of FIG. 11, the device control module 250 of the electronic device receives, from the server 300, the control command transmitted from the external device 500 to the server 300 in S91 and S92, and then check the control authority of the control command in the first device specification and then execute the control command in S93, and then transmits the execution result data as the result of executing the control command to the server 300 in S94.

Then, the server 300 may transmit the execution result data to the external device 500 in S95.

FIG. 12 and FIG. 13 are diagrams showing a configuration of a device specification when software is installed on an electronic device according to an embodiment of the present disclosure.

210*a* in FIG. 12 indicates the device storage module when the software version is 1.5. Reference to 210*a* is made. The software version is 1.5, and the functions provided therefrom are "Function_A" and "Function_B". A device specification 410*a* stored in the device storage module defines Interface_01 and Interface_02. Interface_01 presents setting predetermined parameters (para1, para2) to "Function_A" and executing "Function_A". Furthermore, Interface_02 presents setting a predetermined parameter (para3) to "Function_B" and executing "Function_B".

In one example, when the device specification is updated to 410*b*, the updated device specification 410*b* replaces the device specification 410*a*. The device specification indicated by 410*b* includes Interface_01 and Interface_02 presenting the same functions as the functions in 410*a* and changed parameters set thereto. The device specification 410*b* stored in the device storage module defines Interface_01 and Interface_02. Interface_01 presents setting predetermined parameters (para11, para12) to "Function_A" and executing "Function_A". Furthermore, Interface_02 presents setting a predetermined parameter (para15) to "Function_B" and executing "Function_B".

210*b* in FIG. 13 indicates the device storage module when the software version is 1.7. The software version is upgraded to 1.7 and a new function "Function_C" has been added thereto. Accordingly, a new device specification 410*c* defines Interface_01, Interface_02, and Interface_03. Interface_01 presents setting predetermined parameters (para31, para32) to "Function_A" and executing "Function_A". Furthermore, Interface_02 presents setting a predetermined parameter (para33) to "Function_B" and executing "Function_B". Interface_03 presents setting predetermined parameters (para4, para5) to "Function_C" and executing "Function_C".

As shown in FIG. 13, when the software installed on the electronic device is upgraded, the device specification may change. Furthermore, as shown in FIG. 12, the device specification may be changed when the software has not been upgraded.

Regarding FIG. 12 and FIG. 13, the device storage module 210 may store therein the software including one or more functions. This software may be upgraded.

Further, the device specification includes the interface for calling the function and the parameters of the function. Further, the device control module 250 may input the parameters of the device specification into the function and execute the function.

According to one embodiment of the present disclosure, the device specification may be configured as follows.

The device storage module 210 of the electronic device may include a memory.

Additionally, the device specification may be configured in a manner in which a value of a specific location in the memory is set, and this value is identified.

In one embodiment, the device specification may be composed of standard APIs such as get_status(uid) or set-_status(uid, value). uid refers to identification information of a specific location (address) in the memory, and the device control module 250 may update the value using the standard APIs described in the device specification. In other words, the device control module 250 may refer to the status item (uid, value type, value range) in the device specification related to the product status of each electronic device and may change the value of the corresponding item.

In this case, it is assumed that a value of a time duration (seconds) for which the refrigerator's interior light turns on is stored in an area of the memory identified using identification information 19 (a specific area in the memory with an address 19). In this regard, the device specification may be configured to have set_status(19, 5). Then, the device control module 250 sets the value of the identification number 19 in the memory to 5 as indicated in the device specification. Afterwards, the time duration for which the interior light turns on may be set to 5 seconds.

When the device specification is configured in this manner, a specific value of the information stored in the memory is set at a specific location or the value is read therefrom as follows. The values set in the device specification may be configured in a form of a single memory map. The device control module 250 that has downloaded the device specification may apply the contents of the device specification by directly applying the value of the memory map defined in the device specification to the memory in the device storage module 210.

For example, when receiving the first device specification, the contents of the memory including the uid and the corresponding value may be expressed as in Table 1. The memory map may operate in a manner in which the corresponding value is set or read through predetermined memory identification information.

TABLE 1

| uid | Value |
| --- | --- |
| 1 | 3 |
| 2 | 55 |
| . . . | 35 |
| 19 | 5 |
| . . . | . . . |

Further, when a new second device specification is received, the contents of the new memory may be expressed as in Table 2. The value of the area where the uid is 19 has been changed from 5 to 3.

TABLE 2

| uid | Value |
| --- | --- |
| 1 | 3 |
| 2 | 55 |
| . . . | 35 |
| 19 | 3 |
| . . . | . . . |

In other words, the device storage module may include the memory map, and the device specification may include specific identification information of the memory map and the value of the memory map. Further, the device control module 250 performs control or monitoring on the product using the values of the memory map. The scenario (a set of tasks for control or monitoring) provided from the device control module 250 may apply values set in the memory to perform control or monitoring-related functions.

FIG. 14 and FIG. 15 are diagrams showing an interface through which an external device controls an operation of an electronic device according to an embodiment of the present disclosure. An embodiment where the electronic device is a refrigerator will be described.

As shown in FIG. 14 and FIG. 15, external devices 500a, 500b, 500c, and 500d are executing apps. The external device may execute the app, and may select four functions (brightness control, door open notification control, customized deodorization, and dispenser settings) to control the refrigerator.

Reference to FIG. 14 will be made.

In one embodiment, the external device 500a that performs brightness adjustment may display an interface for knock-on brightness/time adjustment on the screen. Regarding the knock-on, a portion of the refrigerator door is composed of a transparent display, and when the user taps or touches the transparent display (knock-on), the display turns on or the screen switches to a transparent display mode, thereby allowing the user to identify the situation inside the refrigerator without opening the door.

The user may use the external device 500a to adjust the brightness and the turn-on time of each of the external light and the interior light in relation to the knock-on.

Additionally, the user may use the external device 500b to adjust the notification time to notify that the refrigerator door is open. For example, the user may control a time elapsed after the refrigerating compartment door is opened at which a notification is performed, or a time elapsed after the freezer compartment door is opened at which a notification is performed. Additionally, the user may control not to perform the notification.

Reference to FIG. 15 will be made.

The user may set a time interval and a time duration related to deodorizing the refrigerator using the external device 500c. The users may control the operation of components related to interior hygiene, such as deodorization using UV (ultraviolet) nano or ultraviolet rays of a water purifier.

Furthermore, the user may adjust dispenser settings using the external device 500d. For example, as shown in 500d, the dispenser is set to a default in which the dispenser dispenses water. However, the user may set whether the dispense setting returns to the default setting of "water" after the user withdraws the ice. Alternatively, the user may set a time duration which it takes to return to the default setting of "water" after the user withdraws the ice.

An embodiment of the present disclosure in which all the components are combined with each other or operate in combination with each other has been described. However, the present disclosure is not necessarily limited to this embodiment. Within the scope of the purpose of the present disclosure, at least two of all components may be selectively combined with other or may operate in the selectively combined manner with other. Furthermore, each of the components may be implemented as an independent hardware. However, some or all of the components may be selectively combined with each other and thus may be implemented using a computer program with a program module to perform some or all of the functions combined in one or more pieces of hardware. The codes and code segments that constitute the computer program may be easily deduced by a person skilled in the art from the present disclosure. The computer program may be stored in computer readable media and read and executed by a computer, thereby implementing the method of the present disclosure. The storage media for storing the computer program may include storage media including magnetic recording media, optical recording media, and semiconductor recording devices. Additionally, the computer program implementing an embodiment of the present disclosure includes a program module configured to is transmitted in real time through an external device.

The above description has been made based on the embodiment of the present disclosure. However, various changes or modifications may be made at the level of an ordinary technician. Therefore, it may be understood that such changes and modifications are included within the scope of the present disclosure as long as they do not go beyond the scope of the present disclosure.

REFERENCE NUMERALS

| | |
|---|---|
| 100: Control device | 200: Electronic device |
| 300: Server | 500: External device |

The invention claimed is:

1. An electronic device comprising:
a device storage module configured to store therein a first device specification received from a server; and
a device control module configured to perform monitoring according to a monitoring rule defined in the first device specification and generate a first dataset, and to transmit the generated first dataset to the server,
wherein the device control module is configured to:
identify whether the device specification has been updated in the server according to a preset period; and
upon identification that the device specification has been updated in the server, receive the updated device specification from the server and store the updated device specification in the device storage module.

2. The electronic device of claim 1, wherein the first device specification includes at least one of a periodic rule, a conditional rule, or a request based rule under which a status of a component of the electronic device is monitored.

3. The electronic device of claim 1, wherein the device control module is configured to receive a certificate from the server and store the certificate in the device storage module, wherein the device control module is configured to:
compare a monitoring authority defined in the first device specification with an authority defined in the certificate with each other;

apply a monitoring setting for which the authority defined in the first device specification is valid based on the comparing result; and
generate the first dataset based on the application result.

4. The electronic device of claim 1, wherein the first device specification includes information about an external device as a receiving device of the first dataset,
wherein the device control module is configured to perform monitoring according to a monitoring rule defined in the first device specification and generate the first dataset, and to transmit the first dataset to the external device.

5. The electronic device of claim 1, wherein the server includes:
a server storage module configured to store therein the device specification; and
a server control module configured to transmit the device specification to the electronic device, and then receive the dataset generated by the electronic device according to the monitoring rule defined in the device specification from the electronic device,
wherein the server control module is configured to receive a plurality of device specifications from a control device and to store the plurality of device specifications in the server storage module or update the plurality of device specifications under control of the control device,
wherein the electronic device performs a secure connection with the server.

6. An electronic device comprising:
a device storage module configured to store a first device specification received from a server storing therein a certificate; and
a device control module configured to:
perform a secure connection using the server using the certificate;
execute a control rule defined in the first device specification;
generate first execution result data as a result of the execution of the control rule; and
transmit the first execution result data to the server,
wherein the device control module is configured to:
identify whether the device specification has been updated in the server according to a preset period; and
upon identification that the device specification has been updated in the server, receive the updated device specification from the server and store the updated device specification in the device storage module.

7. The electronic device of claim 6, wherein the control rule defined in the first device specification includes a change rule of a setting value in the electronic device or an execution rule of a scenario stored in the electronic device.

8. The electronic device of claim 6, wherein the device control module is configured to receive the certificate from the server and store the certificate in the device storage module,
wherein the device control module is configured to:
compare a control authority defined in the first device specification with an authority defined in the certificate;
apply a control setting for which the authority defined in the first device specification is valid based on the comparing result; and
generate the first execution result data based on the application result.

9. The electronic device of claim 6, wherein the first device specification includes information about an external device as a receiving device of the first execution result data, wherein the device control module is configured to execute the control rule defined in the first device specification, to generate the first execution result data, and to transmit the first execution result data to the external device.

10. The electronic device of claim 6, wherein the server includes:

a server storage module configured to store therein the certificate and the device specification; and a server control module configured to transmit the device specification to the electronic device, and then receive the execution result data generated by the electronic device executing the control rule defined in the device specification from the electronic device, wherein the server control module is configured to receive a plurality of device specifications from a control device and to store the plurality of device specifications in the server storage module or update the plurality of device specifications under control of the control device, wherein the electronic device performs a secure connection with the server using the certificate.

11. The electronic device of claim 6, wherein the device control module is configured to:

receive, from the server, a control command transmitted from an external device to the server;

identify a control authority of the control command based on the first device specification;

execute the control command; and transmit execution result data as a result of executing the control command to the server, wherein the server is configured to transmit the execution result data to the external device.

12. A method for performing monitoring and control based on a device specification, the method comprising:

receiving, by an electronic device, a first device specification from a server; and transmitting, by the electronic device, to the server, a first result generated by the electronic device according to a rule defined in the first device specification, wherein the method further comprises:

identifying, by the electronic device, whether the device specification has been updated in the server according to a preset period; and upon identification that the device specification has been updated in the server, receiving and storing by the electronic device, the updated device specification from the server.

13. The method of claim 12, wherein the method further comprises, before the receiving of the first device specification, performing, by the electronic device, a secure connection with the server and using a certificate.

14. The method of claim 12, wherein the first device specification includes:

a rule for monitoring a status of a component of the electronic device and control information for the component of the electronic device.

15. The method of claim 13, wherein the method further comprises:

receiving and storing, by the electronic device, the first device specification from the server;

comparing a monitoring authority or a control authority defined in the first device specification with an authority defined in the certificate;

applying a monitoring setting or a control setting for which the authority defined in the first device specification is valid based on the comparing result; and generating the first result based on the application result.

16. The method of claim 12, wherein the first device specification includes information about an external device as a receiving device of the first result, wherein the method further comprises generating the first result by the electronic device performing monitoring and control according to the rule defined in the first device specification, and transmitting, by the electronic device, the first result to the external device.

17. The method of claim 12, wherein the electronic device includes a memory map, and the first device specification includes specific identification information of the memory map and a value of the memory map, wherein the method further comprises, performing, by the electronic device, control or monitoring using the value of the memory map.

* * * * *